(12) United States Patent
Griggs et al.

(10) Patent No.: US 7,966,793 B2
(45) Date of Patent: Jun. 28, 2011

(54) MODULAR CLIPPING PACKAGING APPARATUS AND ASSOCIATED DEVICES, METHODS, SYSTEMS AND COMPUTER PROGRAM PRODUCTS

(75) Inventors: Samuel D. Griggs, Raleigh, NC (US); Dennis J. May, Pittsboro, NC (US); David T. Wince, Fuquay-Varina, NC (US); William M. Poteat, Fuquay-Varina, NC (US); Derek L. Brown, Apex, NC (US)

(73) Assignee: Tipper Tie, Inc., Apex, NC (US)

( * ) Notice: Subject to any disclaimer, the term of this patent is extended or adjusted under 35 U.S.C. 154(b) by 1139 days.

(21) Appl. No.: 11/151,670

(22) Filed: Jun. 13, 2005

(65) Prior Publication Data
US 2005/0247026 A1 Nov. 10, 2005

Related U.S. Application Data

(60) Provisional application No. 60/579,821, filed on Jun. 15, 2004.

(51) Int. Cl.
*B65B 47/00* (2006.01)
*B65B 61/00* (2006.01)
(52) U.S. Cl. .......................................... 53/578
(58) Field of Classification Search ................ 53/138.2, 53/138.3, 138.1–4, 567, 578, 568; 29/243.56–57; 452/30, 35, 37, 48
See application file for complete search history.

(56) References Cited

U.S. PATENT DOCUMENTS

| | | |
|---|---|---|
| 2,720,055 A | 10/1955 | Morris |
| 2,880,419 A | 4/1959 | Tipper |
| 3,342,017 A | 9/1967 | Yerkey |
| 3,358,418 A | 12/1967 | Manetta |
| 3,383,754 A | 5/1968 | Klenz |
| 3,389,533 A | 6/1968 | Tipper et al. |
| 3,400,433 A | 9/1968 | Klenz |
| 3,499,259 A | 3/1970 | Tipper et al. |

(Continued)

FOREIGN PATENT DOCUMENTS
DE 2452760 5/1976
(Continued)

OTHER PUBLICATIONS
U.S. Appl. No. 10/969,717, filed Oct. 20, 2004.
(Continued)

*Primary Examiner* — Rinaldi I. Rada
*Assistant Examiner* — John Paradiso
(74) *Attorney, Agent, or Firm* — Myers Bigel Sibley & Sajovec, P.A.

(57) ABSTRACT

Packaging apparatus modules include a frame with a base adapted to reside on a support floor, the frame having opposing right and left hand frame sides and at least one lateral beam that extends therebetween, the right and left hand frame sides comprising respective upwardly extending frame portions which are configured to reside on opposing sides of a longitudinal product travel path having an axially extending centerline; and a clipper mechanism configured to selectively attach to either one of the right and left hand frame sides in a manner that positions the clipper mechanism at a substantially common operative full-clip location in the product travel path when mounted to either the right or left hand frame sides to thereby allow build options with selectable mounting orientations.

36 Claims, 26 Drawing Sheets

U.S. PATENT DOCUMENTS

| | | | |
|---|---|---|---|
| 3,543,378 A | 12/1970 | Klenz | |
| 3,587,204 A | 6/1971 | George | 53/138.4 |
| 3,662,514 A | 5/1972 | Goss | 53/567 |
| 3,719,022 A | 3/1973 | Cherio | |
| 3,732,662 A | 5/1973 | Paxton | 53/415 |
| 3,797,199 A | 3/1974 | Seifert | |
| 3,815,323 A | 6/1974 | Longo | 53/530 |
| 3,945,171 A | 3/1976 | Arietta et al. | 53/576 |
| D243,158 S | 1/1977 | Bolwell | D15/145 |
| 4,044,450 A | 8/1977 | Raudys et al. | |
| 4,091,595 A | 5/1978 | Peister et al. | 53/417 |
| 4,146,128 A * | 3/1979 | Hogg et al. | 206/776 |
| 4,165,593 A | 8/1979 | Niedecker | |
| 4,247,005 A * | 1/1981 | Buxton | 206/525 |
| 4,430,772 A | 2/1984 | Michel et al. | |
| 4,505,003 A | 3/1985 | Becker et al. | 53/576 |
| 4,516,387 A * | 5/1985 | Kupcikevicius | 452/40 |
| 4,525,898 A | 7/1985 | Gallion et al. | 24/30.5 W |
| 4,537,006 A | 8/1985 | Pieri | 53/134 |
| 4,590,748 A | 5/1986 | Harrison et al. | 53/576 |
| 4,651,498 A | 3/1987 | Piereder | 53/122 |
| 4,675,945 A | 6/1987 | Evans et al. | 452/48 |
| 4,683,700 A | 8/1987 | Evans et al. | 53/138.4 |
| 4,766,713 A | 8/1988 | Evans | 53/138.2 |
| 4,847,953 A | 7/1989 | Evans et al. | 452/36 |
| 4,944,172 A | 7/1990 | Evans | 72/53 |
| 4,969,233 A | 11/1990 | Stanley | |
| 5,016,424 A | 5/1991 | Stirling | 53/459 |
| 5,017,175 A | 5/1991 | Klusmire | |
| 5,024,041 A | 6/1991 | Urban et al. | 53/449 |
| 5,042,234 A | 8/1991 | Evans et al. | 53/523 |
| 5,044,144 A | 9/1991 | Foote et al. | 29/803 |
| 5,067,313 A | 11/1991 | Evans | 53/576 |
| 5,074,386 A | 12/1991 | Evans | 188/67 |
| 5,085,036 A | 2/1992 | Evans et al. | 53/550 |
| 5,107,666 A | 4/1992 | Rahtican | |
| 5,109,648 A | 5/1992 | Evans | |
| 5,135,770 A | 8/1992 | Underwood | 426/271 |
| 5,161,347 A | 11/1992 | May et al. | 53/138.2 |
| 5,165,216 A | 11/1992 | May et al. | |
| 5,167,567 A | 12/1992 | Evans | 452/37 |
| 5,181,302 A | 1/1993 | Evans | 29/243.56 |
| 5,203,760 A | 4/1993 | Chen et al. | 493/302 |
| D340,467 S | 10/1993 | Pollak et al. | D15/150 |
| 5,402,625 A | 4/1995 | Halstead | 53/570 |
| 5,421,142 A | 6/1995 | Cullen | |
| 5,426,910 A * | 6/1995 | Cullen | 53/128.1 |
| 5,476,673 A | 12/1995 | Sombrio | |
| 5,495,701 A | 3/1996 | Poteat et al. | 53/138.2 |
| 5,570,561 A | 11/1996 | May et al. | 53/138.4 |
| 5,586,424 A | 12/1996 | Chen et al. | 53/138.2 |
| 5,715,656 A | 2/1998 | Pearce | |
| 5,884,346 A | 3/1999 | Hengl | |
| 6,052,972 A | 4/2000 | Rea et al. | 53/576 |
| 6,131,367 A | 10/2000 | Fukuda et al. | |
| 6,401,885 B1 | 6/2002 | Whittlesey | 188/322.16 |
| 6,604,338 B1 * | 8/2003 | May et al. | 53/138.2 |
| 6,637,075 B1 | 10/2003 | Gorman et al. | 24/30.5 W |
| 6,694,711 B1 | 2/2004 | Cullen | 53/567 |
| 6,695,364 B2 | 2/2004 | Bierlin | 292/307 |
| 6,708,742 B2 | 3/2004 | Weathers et al. | |
| 6,719,194 B2 | 4/2004 | Richards | |
| 6,729,102 B2 * | 5/2004 | Ailey et al. | 53/134.1 |
| 6,745,547 B2 | 6/2004 | Bussey et al. | 53/576 |
| 6,883,297 B2 | 4/2005 | Kirk et al. | 53/502 |
| 6,932,688 B2 * | 8/2005 | Stanley et al. | 452/48 |
| 6,945,171 B1 | 9/2005 | Marietta et al. | |
| 6,976,346 B2 | 12/2005 | May et al. | |
| 2003/0131564 A1 | 7/2003 | Ailey et al. | |
| 2004/0250512 A1 | 12/2004 | May et al. | |
| 2005/0034426 A1 | 2/2005 | Griggs | |
| 2005/0039419 A1 | 2/2005 | Griggs et al. | |
| 2005/0053699 A1 | 3/2005 | Whittlesey | |
| 2005/0072119 A1 | 4/2005 | Griggs et al. | |
| 2005/0087075 A1 | 4/2005 | Mysker | |
| 2005/0101240 A1 | 5/2005 | Mysker | |
| 2005/0229541 A1 | 10/2005 | Griggs | |
| 2005/0235608 A1 | 10/2005 | Griggs et al. | |
| 2005/0274088 A1 | 12/2005 | Griggs | |
| 2005/0284108 A1 | 12/2005 | Griggs | |

FOREIGN PATENT DOCUMENTS

| | | |
|---|---|---|
| EP | 0 301 768 | 2/1989 |
| EP | 0301768 | 2/1989 |
| GB | 1491444 | 11/1977 |
| GB | 1564397 | 4/1980 |
| JP | 2002-019735 | 1/2002 |
| WO | WO 00/20282 | 4/2000 |
| WO | WO 2004/007298 | 1/2004 |
| WO | WO 2004/007298 A2 | 1/2004 |
| WO | WO 2004/007298 A3 | 1/2004 |
| WO | WO 2005/044020 | 5/2005 |

OTHER PUBLICATIONS

U.S. Appl. No. 11/256,809, filed Oct. 24, 2005, Gupton.
U.S. Appl. No. 11/262,600, filed Oct. 31, 2005, Wince.
U.S. Appl. No. 60/579,709, Poteat et al.
Brochure *TCM 2250 Pumpable for muscle pieces*, 2 sheets, 1994 ©.
International Search Report and Invitation to Pay Additional Fees for PCT application No. PCT/US2005/0200019 dated Oct. 28, 2005.
International Search Report and Written Opinion of the International Searching Authority for PCT application PCT/US2005/020006 dated Oct. 25, 2005.
International Search Report and Written Opinion of the International Searching Authority for International Patent Application No. PCT/US2005/017252 mailed on Sep. 7, 2005.
Product Brochure, 1 sheet, "Tipper Clipper®-Signature Series SZ3214 Double Clipper for Netting," © 2002.
Product Brochure, 1 sheet, "Tipper Netter TN-3000 Automatic Netting-Packaging Machine," © 2002.
Product Brochure, 1 sheet, "Tipper Tie-Net, Safely and quickly package plugs before shipping," © 1999.
Product Brochure, 2 sheets, "Net-All Sleeved Plastic Netting System," © 2000.
Product Brochure, 2 sheets, "Tipper Net Z3200 Double Clipper and Plant Netting System," © 2000.
Product Brochure, 4 sheets, "Net-All® Netting Is the answer to All Your Horticultural Applications," © 2001.
Product Brochure, 6 sheets, "Tipper Net for Smoking, Hanging & Decoration, Net-All® Netting Is the Answer," © 2000.
Rigidized Metals Corporation, Corporate Profile, 1 page, <http://www.rigidized.com> accessed on Sep. 23, 2005, but for the purposes of examination, the reference is deemed to be before the priority filing date of the instant application.
www.mcmaster.com, Compressed Air Flow Control Valves, 1 sheet, Date unknown but believed to be before Oct. 2004.
www.tippertie.com/smoked/tcm2250.asp, 2 sheets, date believed to be before Nov. 1, 2004.
International Search Report and Written Opinion of the International Searching Authority for PCT application No. PCT/US2005/020019 dated Jan. 16, 2006.
International Search Report and Written Opinion of the International Searching Authority dated Oct. 25, 2005 for corresponding PCT application No. PCT/US2005/020006.

* cited by examiner

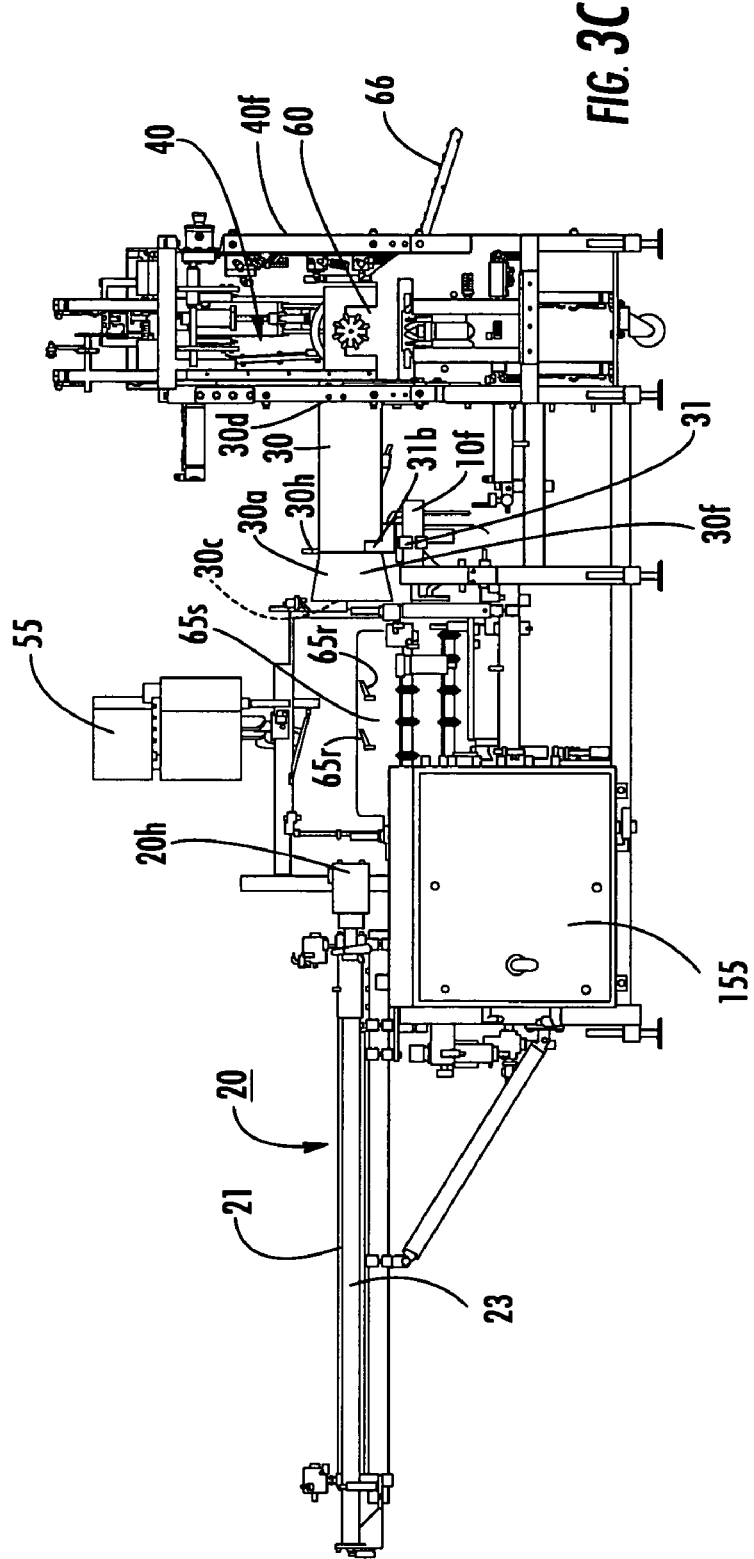

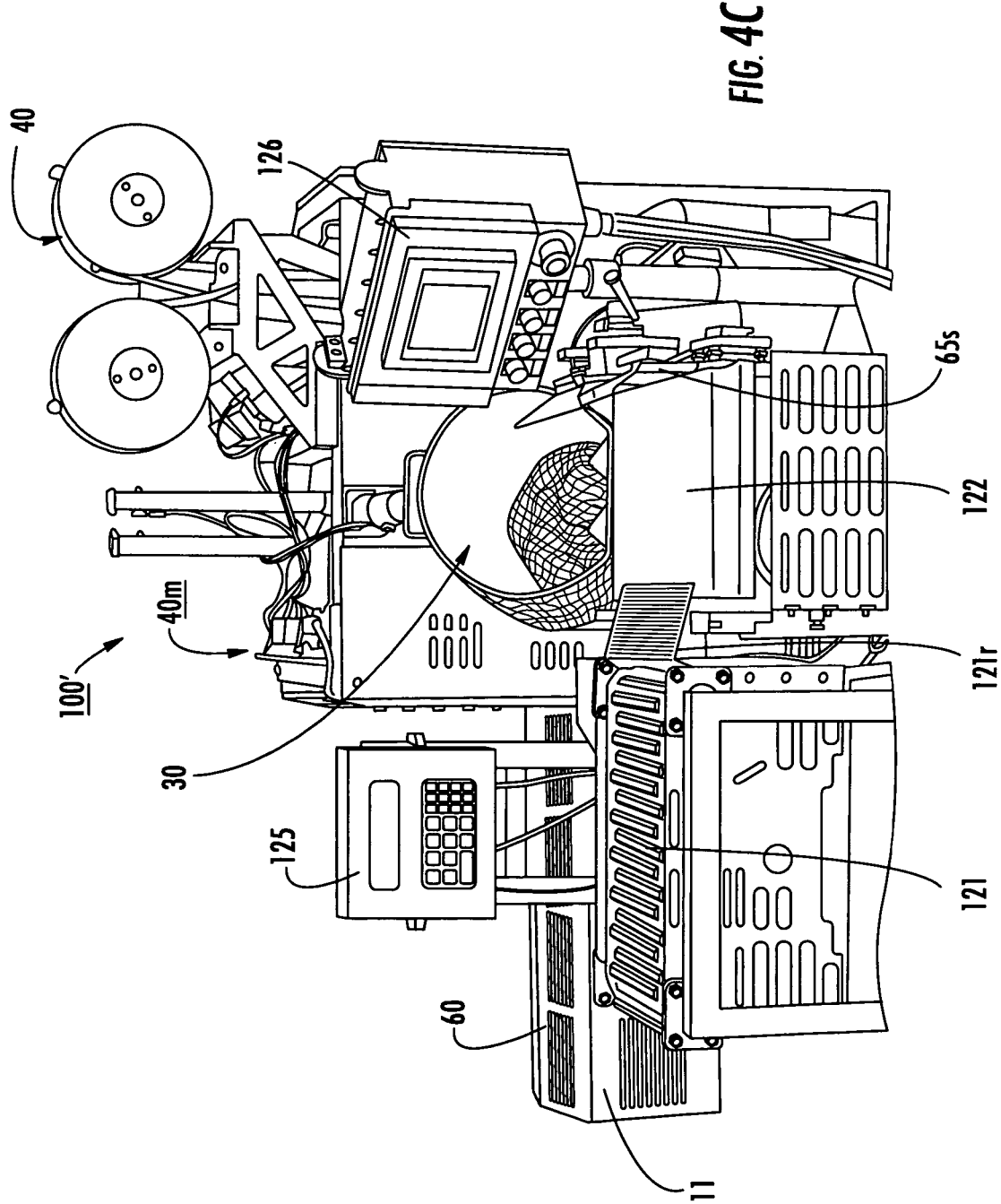

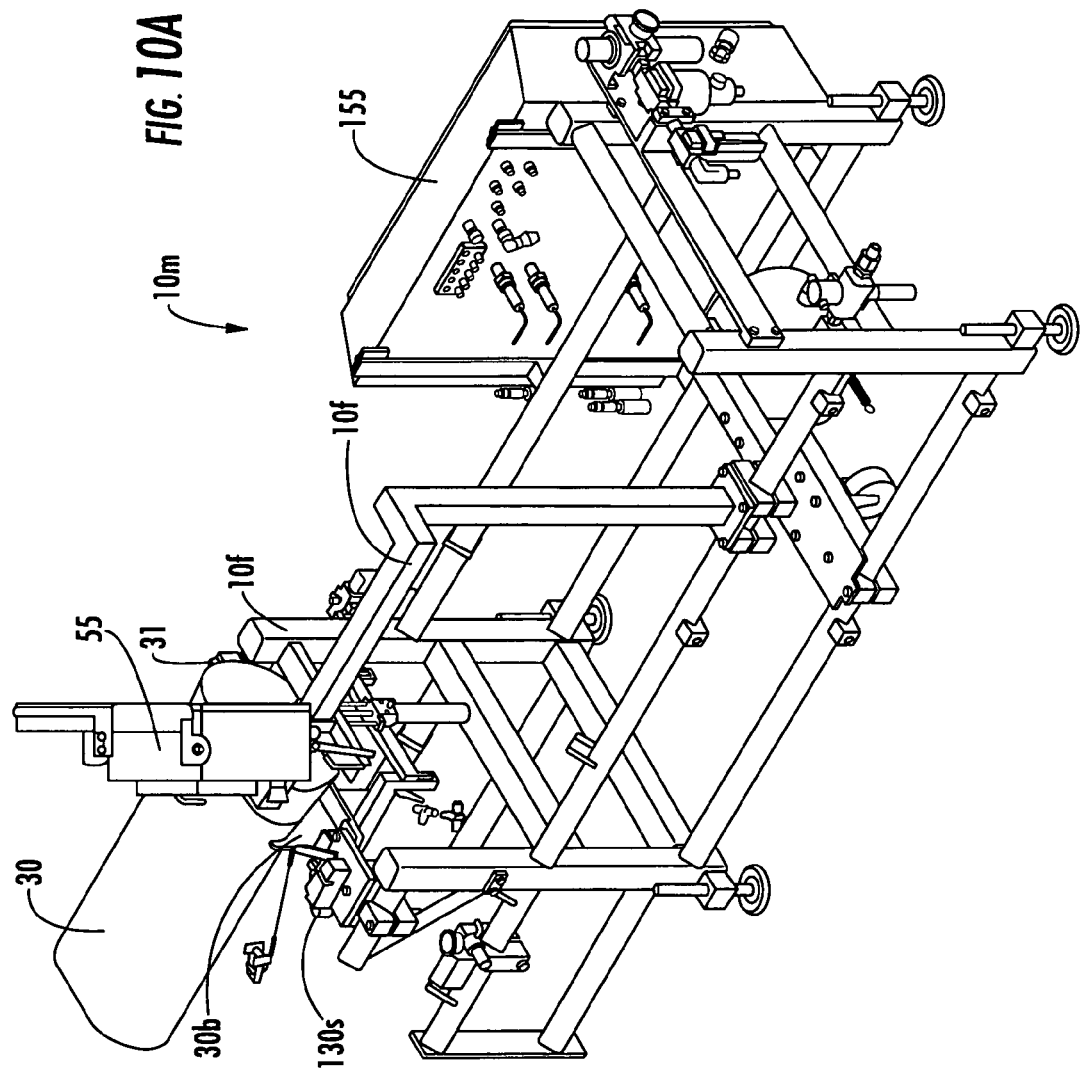

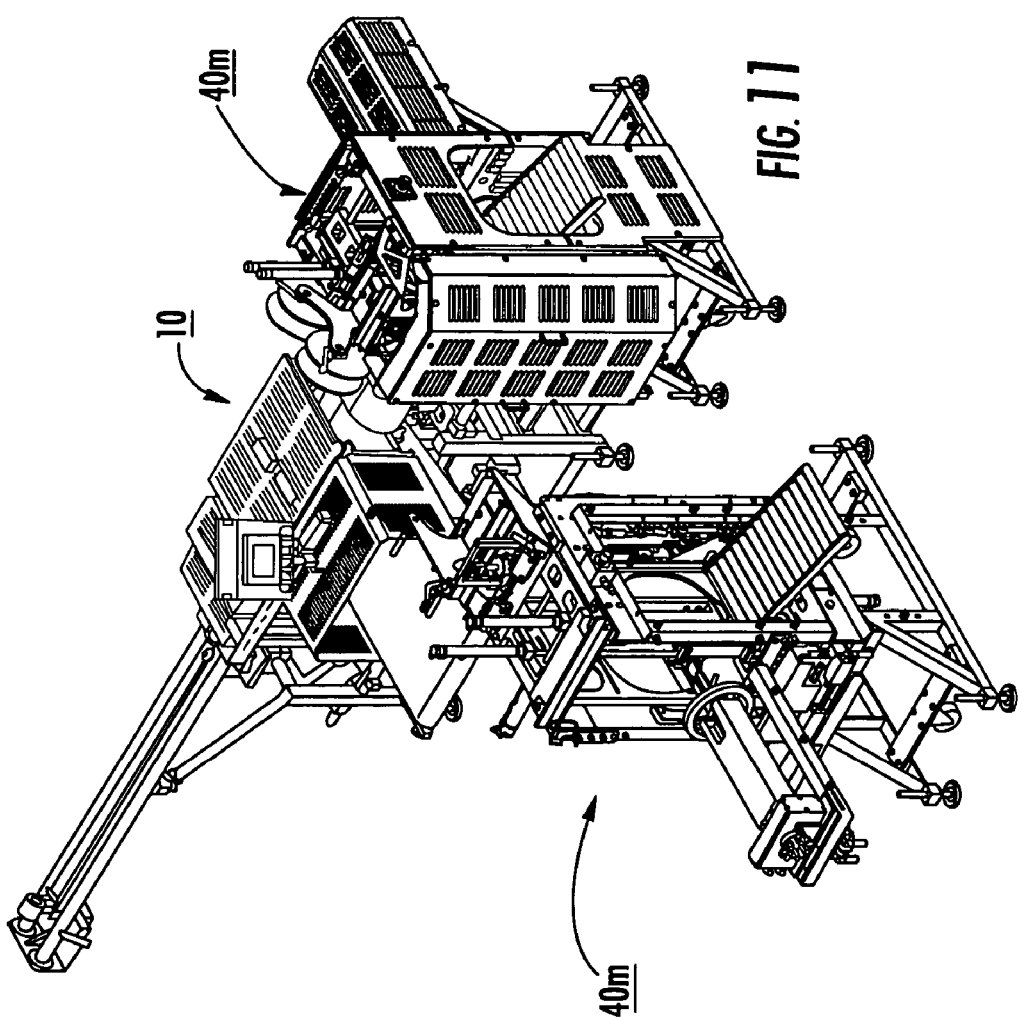

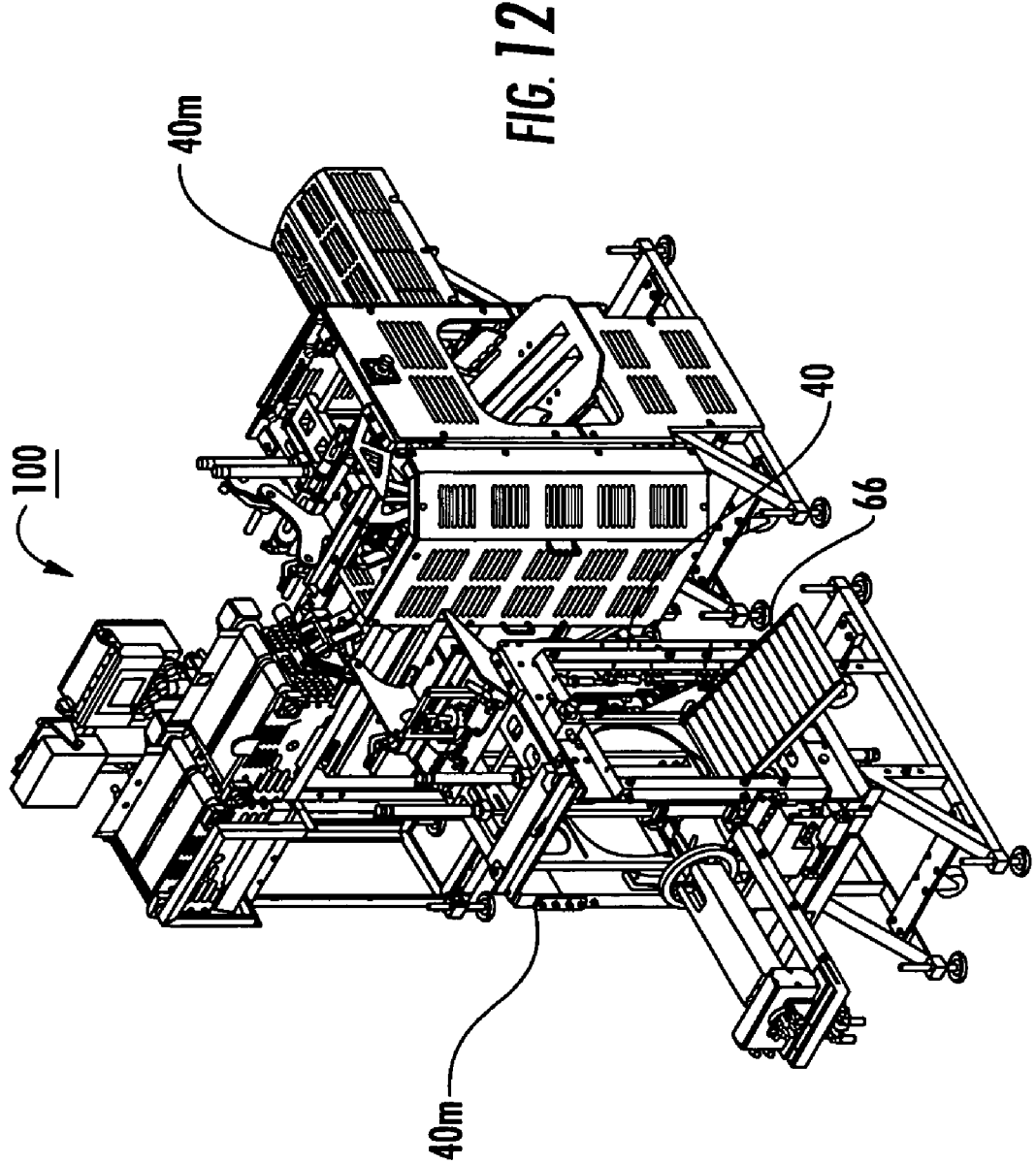

MODULAR CLIPPING PACKAGING APPARATUS AND ASSOCIATED DEVICES, METHODS, SYSTEMS AND COMPUTER PROGRAM PRODUCTS

RELATED APPLICATIONS

This application claims the benefit of priority to U.S. Provisional Patent Application Ser. No. 60/579,821, filed Jun. 15, 2004, the contents of which are hereby incorporated by reference as if recited in full herein.

FIELD OF THE INVENTION

The present invention relates to apparatus that can package and apply closure clips to materials that enclose products therein, and may be particularly suitable for clipping netting material.

BACKGROUND OF THE INVENTION

Certain types of commodity and/or industrial items can be packaged by placing the desired product(s) in a covering material and then applying a closure clip or clips to end portions of the covering material to secure the product(s) therein. For non-flowable piece goods, the piece goods can be held individually in a respective clipped package, or as a group of goods in a single package. The covering material can be any suitable material, typically a casing and/or netting material.

Generally described, when packaging a piece good product in netting, the product is manually pushed through a netting chute. The product can include, by way of example, a non-flowable semi-solid and/or solid object such as a meat product including whole or half hams, turkey, chicken, and the like. The netting chute holds a length of a netting sleeve over the exterior thereof. A first downstream end portion of the netting is typically closed using a first clip. As the product exits the netting chute, it is covered with the netting. An operator can then orient the product inside the netting between the discharge end of the chute and the clipped first end portion of the netting. The operator can then pull the netting so that the netting is held relatively tight (typically stretched or in tension) over the product. The operator then uses his/her hands to compress or gather the open end of the netting (upstream of the product) and manually applies a clip to the netting, typically using a Tipper Tie® double clipper apparatus. A clip attachment apparatus or "clippers" are well known to those of skill in the art and include those available from Tipper Tie, Inc., of Apex, N.C., including product numbers Z3214, Z3202, and Z3200. Examples of clip attachment apparatus and/or packaging apparatus are described in U.S. Pat. Nos. 3,389,533; 3,499,259; 4,683,700; and 5,161,347, the contents of which are hereby incorporated by reference as if recited in full herein.

The double clipper concurrently applies two clips to the netting proximate the open (upstream) end of the package. One clip defines the first end portion of the next package and the other defines the trailing or second end portion of the package then being closed. A cutting mechanism incorporated in the clipper apparatus can sever the two packages before the enclosed package is removed from the clipper apparatus. U.S. Pat. No. 4,766,713 describes a double clipper apparatus used to apply two clips to a casing covering. U.S. Pat. No. 5,495,701 proposes a clipper with a clip attachment mechanism configured to selectively fasten a single clip or two clips simultaneously. The mechanism has two punches, one of which is driven directly by a pneumatic cylinder and the other of which is connected to the first punch using a pin and key assembly. The pin and key assembly allows the punches to be coupled or decoupled to the pneumatic cylinder drive to apply one single clip or two clips simultaneously. U.S. Pat. No. 5,586,424 proposes an apparatus for movement of U-shaped clips along a rail. The apparatus includes a clip feed for advancing clips on a guide rail and the arm is reciprocally driven by a piston and cylinder arrangement. The contents of each of these patents are hereby incorporated by reference as if recited in full herein.

Other devices provide for semi-automated or automated clipping as described in U.S. patent application Ser. No. 10/339,910 and co-assigned, co-pending U.S. Provisional Patent Application Ser. No. 60/508,659, the contents of which are hereby incorporated by reference as if recited in full herein. U.S. patent application Ser. No. 10/339,910 describes a device with a chute that is configured to package a product, such as a vacuum-packed turkey, and can also form a handle in a tubular covering encasing the product.

SUMMARY OF EMBODIMENTS OF THE INVENTION

Embodiments of the present invention provide apparatus, subassemblies and/or other devices, systems, methods and computer program products for packaging a product in a covering material and/or applying clips thereto.

In certain embodiments, the apparatus defines selectable build options and/or modules for use with more than one type of apparatus and/or sub-modules that can be selectively attached to different sides of a common mounting frame to provide increased build options without customizing each build to meet particular customer requests. The sub-modules can include: a clipper and a handle-maker that can be mounted to a common frame that is configured to accept the clipper and/or handle-maker on either a right or left hand side. The sub-module can also include different selectable discharge tray types and a printer assembly that may also be mounted to either a right or left side of the common frame.

The apparatus can be used to manipulate and package one or more products automatically and/or semi-automatically so that at least one clip is automatically applied to enclose the product in the covering material. Particular embodiments automatically package a discrete object or objects in netting.

Certain embodiments are directed to packaging apparatus modules that include: (a) a frame with a base adapted to reside on a support floor, the frame having opposing right and left hand frame sides and at least one lateral beam that extends therebetween, the right and left hand frame sides comprising respective upwardly extending frame portions which are configured to reside on opposing sides of a longitudinal product travel path having an axially extending centerline; and (b) a clipper mechanism configured to selectively attach to either one of the right and left hand frame sides in a manner that positions the clipper mechanism at a substantially common operative full-clip location in the product travel path when mounted to either the right or left hand frame sides to thereby allow build options with selectable mounting orientations.

The clipper mechanism can be configured to attach to a predetermined upper portion of the first and/or second frame side to be able to pivot in toward the axial centerline of the product travel path to the full clip position whether mounted on the first or right hand side of the frame.

Other embodiments are directed to modular packaging apparatus having multiple selectable sub-module build configurations. The apparatus include: (a) a clipping module and;

(b) a selectable first or second front end module comprising a product chute with an axial centerline extending therethrough configured to reside upstream of a frame of the clipping module and engage the clipping module to align the product chute with a travel path extending through the clipping module to supply product through the product chute to the clipping module. The first selectable front end module includes a first gravity fed module and the second front end module including an automatic pusher module that pushes product through the product chute.

The clipping module includes: (a) a frame with a base adapted to reside on a support floor, the frame having opposing right and left hand frame sides, at least one lateral upper beam and at least one lateral lower beam that extend therebetween, the right and left hand frame sides comprising respective upwardly extending frame portions which are configured to reside on opposing sides of a longitudinal product travel path having an axially extending centerline; (b) a clipper mechanism selectively mountable to the frame at a predetermined location on either the right or left hand side of the frame; (c) an optional printer module with a printer support member that can mount to a predetermined location on the frame; (d) an optional handle maker with handle maker support member that can mount to a predetermined location on either the right or left hand side of the frame, the handle maker support member attaching to the frame on a side that is across from the clipping mechanism; (e) an optional voiding mechanism that mounts to the frame in cooperating communication with the clipper mechanism; (f) an interchangeable first and second discharge tray mountable to the frame downstream of the clipper mechanism; and (g) an actuation cylinder for translating the clipping mechanism through a predetermined travel stroke including a home to a full-clip position.

Still other embodiments are directed to methods of building packaging apparatus with modularized selectable configurations. The methods include: (a) providing a frame configured to accommodate right or left hand mounting at predetermined mounting locations for a plurality of predetermined selectable build modules including a handle-maker module and a clipper mechanism module; (b) selecting desired build modules to mount to the frame from a predetermined build list defining a plurality of selectable predetermined build modules including a handle maker module and a clipper mechanism module; (c) selecting a desired right or left hand mounting orientation for the clipper mechanism module; and (d) mounting the clipper mechanism module to the frame at the selected mounting orientation.

The predetermined list may also include selectable right and left hand housing guards that accommodate the selected build modules and respective selected mounting orientation, and the method further comprises selecting the appropriate right and left hand housing guards corresponding to the selected build modules and mounting orientations. The list may also include a selectable first front-end module that comprises at least one conveyor, a scale, and at least one axially extending product chute with a cavity; and a second front-end module that comprises an in-feed conveyor, a pusher mechanism, and at least one axially extending product chute with a cavity that is in communication with the pusher mechanism. The predetermined list may additional include a selectable first and second control interface with a computer program product that directs the automated or semi-automated operation of the first or second front end module and the clipper mechanism module.

Additional embodiments are directed to factory layouts of side-by-side packaging apparatus. The layouts include: a first packaging apparatus with a clipper module having a frame and a clipper mechanism attached to either a left side of the frame for applying at least one clip to gathered covering material; and a second packaging apparatus disposed side by side of the first packaging apparatus, the second packaging apparatus having a clipper module with a frame and a clipper mechanism attached to a right side of the frame for applying at least one clip to gathered covering material.

In some embodiments, the first and second clipper module frames have a substantially common size and configuration and/or configured to allow right or left hand mounting of the respective clipper mechanism and handle maker.

In particular embodiments, the first and second apparatus are spaced apart a distance to allow a common operator to attend to the discharge portion of each. In some embodiments, the first and second apparatus may be synchronized to output product in a timed manner that allows a single operator to attend to the discharge and/or input of each apparatus. The first and second apparatus may be configured to be in communication with each other. The first and second apparatus may additionally be configured with a computer program product for operating a clipper mechanism and handle maker. The computer program product includes a computer readable storage medium having computer readable program code embodied in the medium. The computer-readable program code includes computer readable program code that allows a set-up operator to select left hand or right hand clipping mechanism and/or handle maker operation.

The computer program product can also include computer readable program code that automatically controllably actuates an automated handle maker to generate a handle from netting and/or computer readable program code that allows a user to select left hand or right hand operation of either the clipping mechanism and/or the handle maker (where operational sequence or direction is different based on the mounting configuration).

In other embodiments the same program control sequence can be used to operate the right or left handed operation of either or both of the handle maker and/or clipping mechanism.

These and other objects and/or aspects of the present invention are explained in detail in the specification set forth below.

BRIEF DESCRIPTION OF THE DRAWINGS

FIG. 3C is a back view of the apparatus shown in FIG. 3A, illustrated with the housing guards removed.

FIG. 4C is a digital image of an apparatus according to embodiments of the present invention.

FIG. 10A is a perspective view of a front-end module having a chute/pusher frame with control box that can be configured to selectively engage clipper modules according to embodiments of the present invention.

FIG. 11 is a perspective view of a factory layout of side-by-side apparatus according to embodiments of the present invention.

FIG. 12 is a perspective view of another factory layout of a side-by-side apparatus according to embodiments of the present invention.

DESCRIPTION OF EMBODIMENTS OF THE INVENTION

Figure 1:
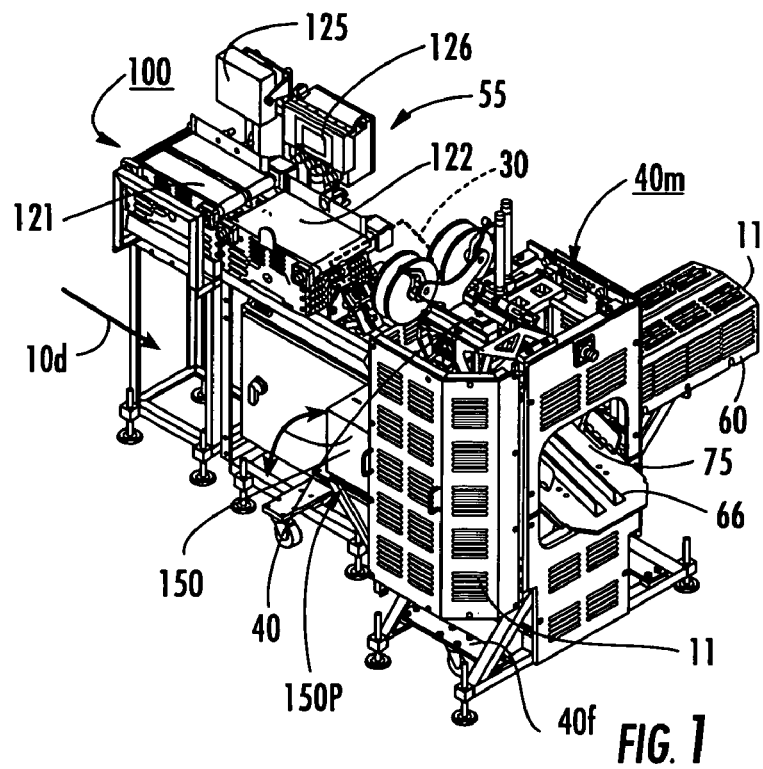
FIG. 1 is a perspective view of an apparatus/system for packaging a product(s) by advancing the product through a product chute and applying at least one clip thereto via a clipping mechanism according to embodiments of the present invention.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain layers, components or features may be exaggerated for clarity, and broken lines illustrate optional features or operations, unless specified otherwise. In addition, the sequence of operations (or steps) is not limited to the order presented in the claims unless specifically indicated otherwise. Where used, the terms "attached", "connected", "contacting", "coupling" and the like, can mean either directly or indirectly, unless stated otherwise. The term "concurrently" means that the operations are carried out substantially simultaneously.

In the description of the present invention that follows, certain terms are employed to refer to the positional relationship of certain structures relative to other structures. As used herein, the terms "front," "forward" and derivatives thereof refer to the general or primary direction that a target product travels for enclosure and/or clipping; this term is intended to be synonymous with the term "downstream," which is often used in manufacturing or material flow environments to indicate that certain material traveling or being acted upon is farther along in that process than other material. Conversely, the terms "rearward," "upstream" and derivatives thereof refer to the directions opposite, respectively, the forward and downstream directions.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this application and should not be interpreted in an idealized or overly formal sense unless expressly so defined herein. It is noted that the features described with respect to one embodiment can apply to another embodiment.

The term "frame" means a generally skeletal structure used to support one or more assemblies, modules and/or components. The term "modular" means that an assembly and/or subassembly is designed with standardized dimensions, mounting features and/or configurations for interchangeable use with replacement modules of the same or similar type and/or other selected different modules. The frame and selected modules may also be configured for selectable mounting on a right or left hand side of a common frame. With respect to the right or left hand side of the mounting frame, the terms refer to the sides of the frame when looking upstream from a discharge end location of a clipper module. It is also noted that different mounting orientation configurations of the modules and/or apparatus may be shown in the figures. Thus, certain figure views may show certain of the devices in different views with different mounting configurations and the views in different figures do not necessarily correspond to a common or single mounting arrangement as different views may have certain components and/or devices oriented differently.

The present invention is particularly suitable for applying closure clips to discrete objects held in a covering material. The covering material may be natural or synthetic and may be a casing material that can be sealed about a product. In certain embodiments the covering material comprises netting. The casing can be any suitable casing (edible or inedible, natural or synthetic) such as, but not limited to, collagen, cellulose, plastic, elastomeric or polymeric casing. In certain embodiments, the casing comprises netting. The term "netting" refers to any open mesh material formed in any form including, for example, knotted, braided, extruded, stamped, knitted, woven or otherwise. Typically, the netting is configured so as to be stretchable in both axial and lateral directions.

Netting or other covering material may be used to package discrete meat products such as loaves of meat, boned ham, spiral sliced ham, deboned ham, turkey, turkey loaves held in molds, or other meat or items directly or with the items held in subcontainers and/or wraps such as molds, trays, boxes, bags, absorbent or protective sheets, sealant, cans and the like. Other embodiments of the present invention may be directed to package other types of food such as cheese, bread, fruit, vegetables, and the like, as well as non-food items. Examples of non-food items that may be packaged using embodiments of the present invention include living items such as flora, trees, and the like, as well as inanimate objects.

Additional examples of products include discrete, semi-solid or solid objects such as firewood, pet food (typically held in a container if the wet type), recreational objects (such as balls), or other solid or semi-solid objects. The product may be packaged for any suitable industry including horticulture, aquaculture, agriculture, or other food industry, environmental, chemical, explosive, or other application. Netting may be particularly useful to package ham or turkeys, manufactured hardware such as automotive parts, firewood, explosives, molded products, and other industrial, consumable, and/or commodity item(s).

Generally stated, embodiments of the present invention are directed at packaging piece goods or discrete items by wrapping or enveloping the goods in a covering material, such as netting, as it (they) exit a product chute, then automatically or semi-automatically clipping the covering material with a closure clip or other attachment or closure means to close the covering and hold the object or objects inside of the covering material. As noted above, clippers are available from Tipper Tie, Inc., of Apex, N.C. Examples of suitable clips include metallic generally "U"-shaped clips available from Tipper Tie, Inc., in Apex, N.C. Other clips, clip materials and clip configurations or closure means may also be used.

Figure 2:
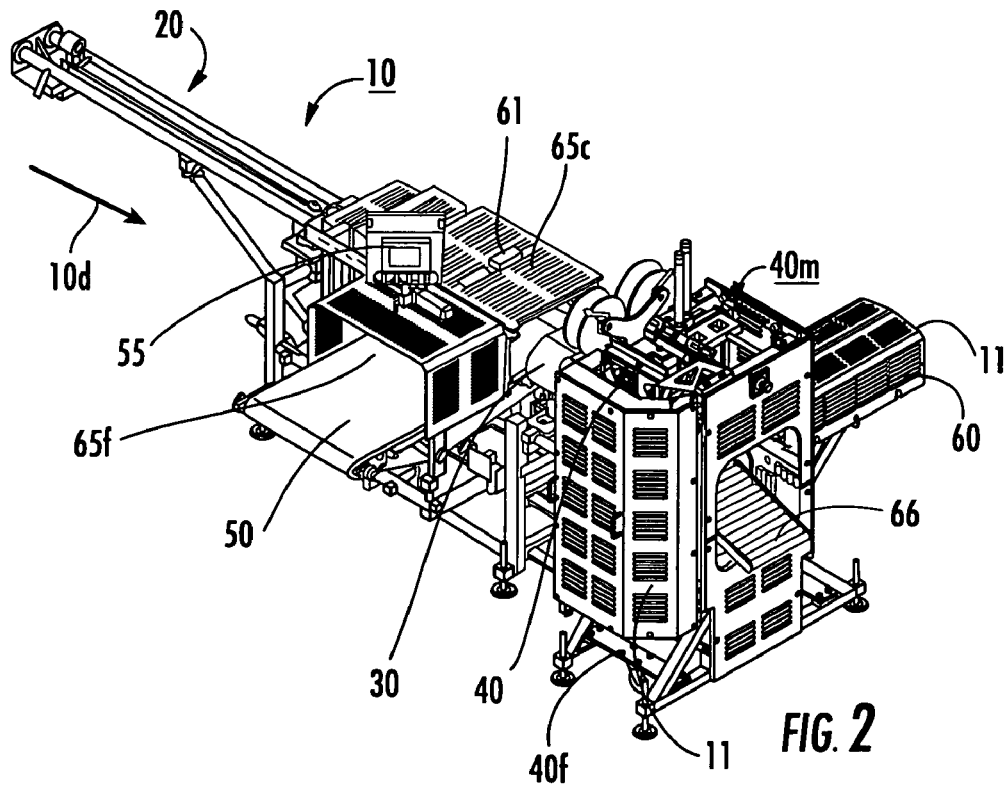
FIG. 2 is a perspective view of a different apparatus/system for packaging a product(s) using a product chute and a product pusher according to other embodiments of the present invention.

FIG. 1 illustrates an exemplary clipping packaging apparatus 100 according to embodiments of the present invention. FIG. 2 illustrates a different packaging apparatus 10. Each packaging apparatus 10, 100 includes a product chute 30, although the product chute in FIG. 1 is omitted for clarity and is indicated in broken line feature representation in an approximate location. The chute 30 in the apparatus 100 shown in FIG. 1 may be inclined and may be at least partially gravity fed. The apparatus 10 shown in FIG. 2 is configured to operate with an automated pusher mechanism 20. Each apparatus 10, 100 includes a clipper module 40m. FIGS. 1 and 2 illustrate that module 40m which can be a discrete portion of the apparatus 10, 100 according to certain embodiments of the present invention. The clipper module 40m can have a frame 40f that is substantially the same for each of the two types of apparatus 10, 100. Each clipper module 40m can be configured to have the same primary operational components or alternative operational components based on predetermined build options. For additional description of the apparatus and/or features thereof, see co-pending, co-assigned U.S. Provisional Application filed Jun. 15, 2004 and identified by 60/579,709, the contents of which are hereby incorporated in their entirety herein.

In certain particular embodiments, the apparatus 10 can be used to package bone-in ham products while the apparatus 100 can be used to package sealed whole poultry products ("whole" meaning generally intact but typically missing the head/neck and/or internal organs).

Figure 3A:
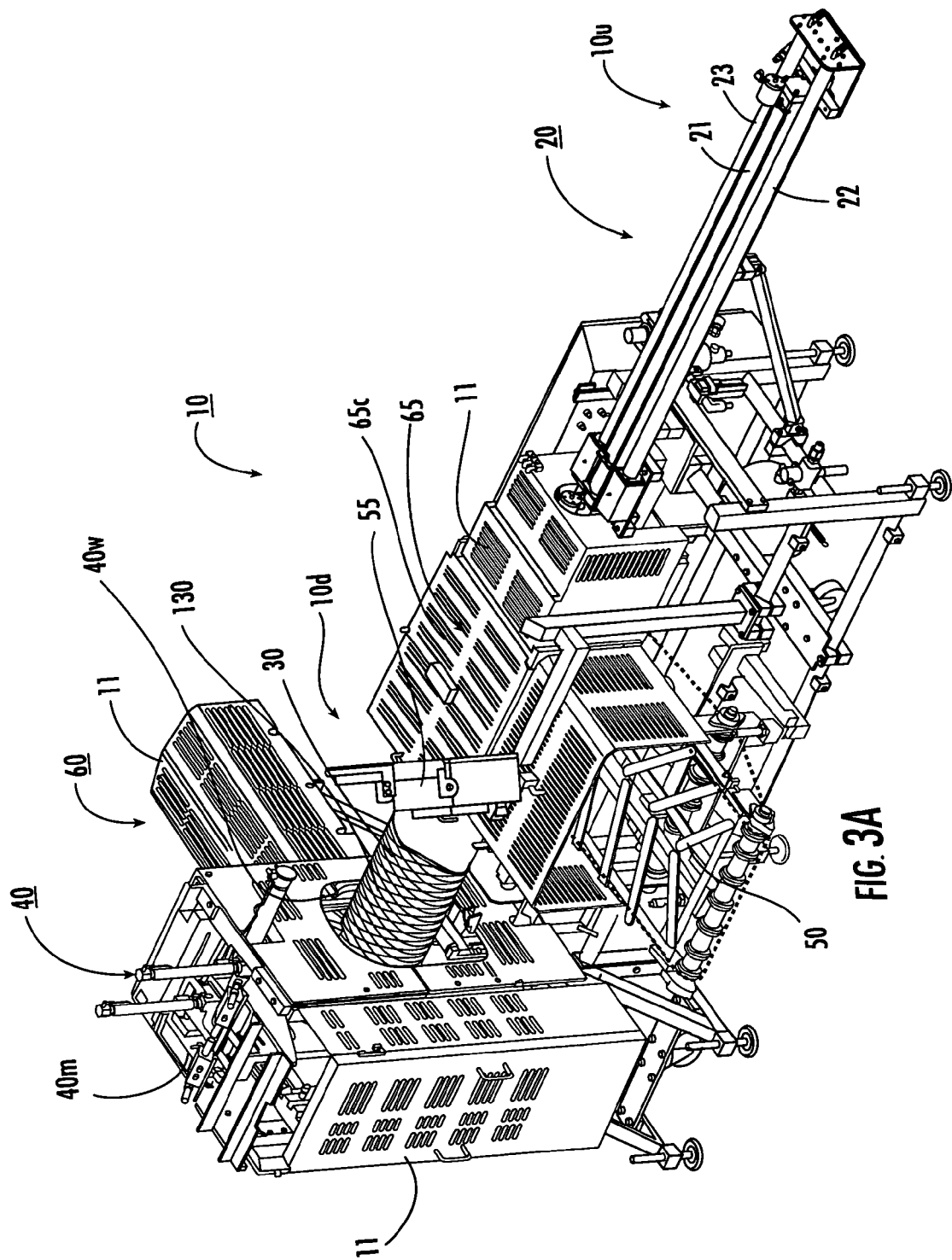
FIG. 3A is a perspective view of an apparatus/system used to advance objects through a product chute and apply at least one clip according to embodiments of the present invention.
Figure 5A:
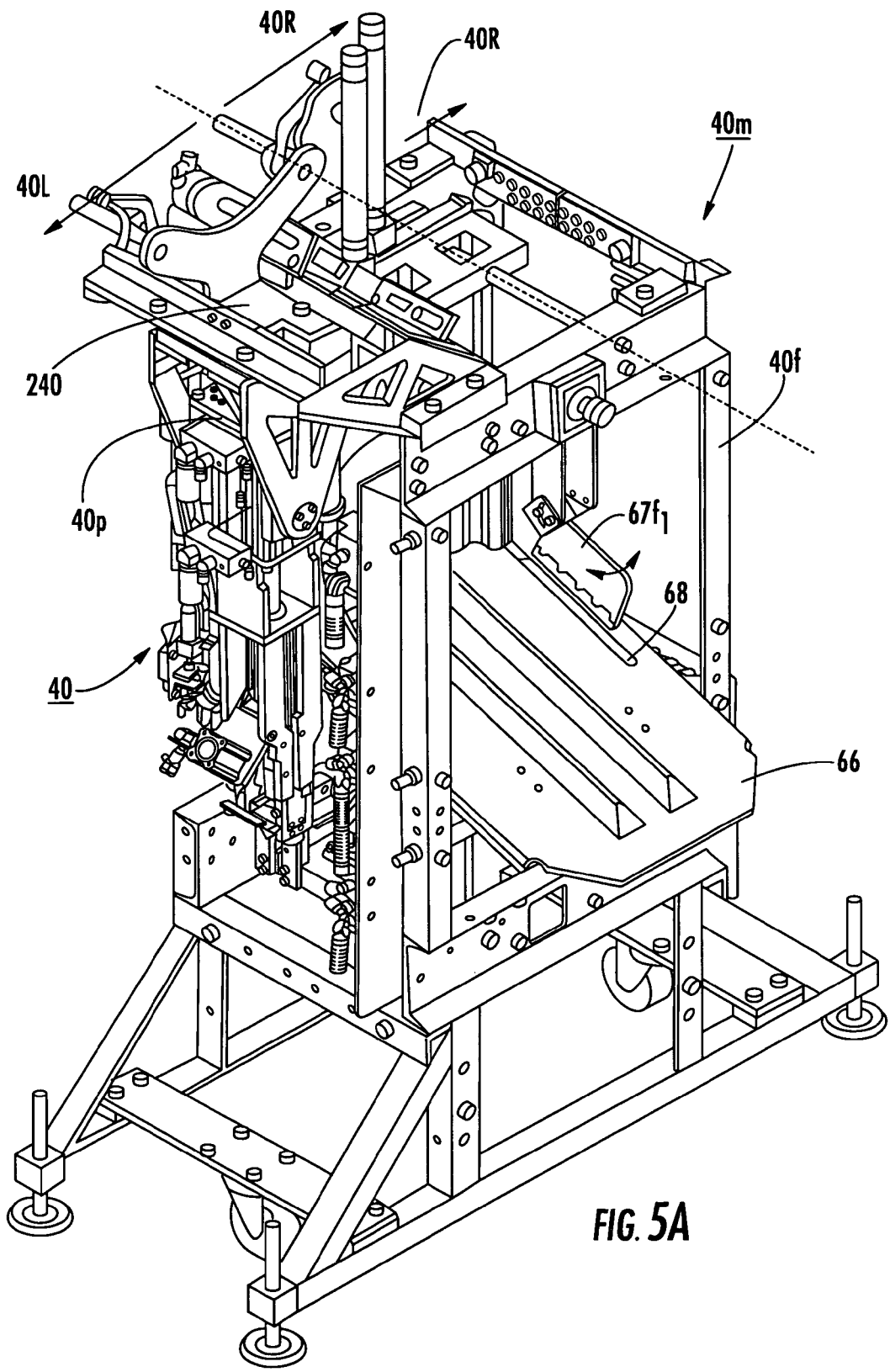
FIG. 5A is a perspective view of a module housing a clipping mechanism that can form part of either of the apparatus shown in FIGS. 1 and 2, the clipper mechanism illustrated in a home position and mounted to the right side of the frame, according to embodiments of the present invention.
Figure 5B:
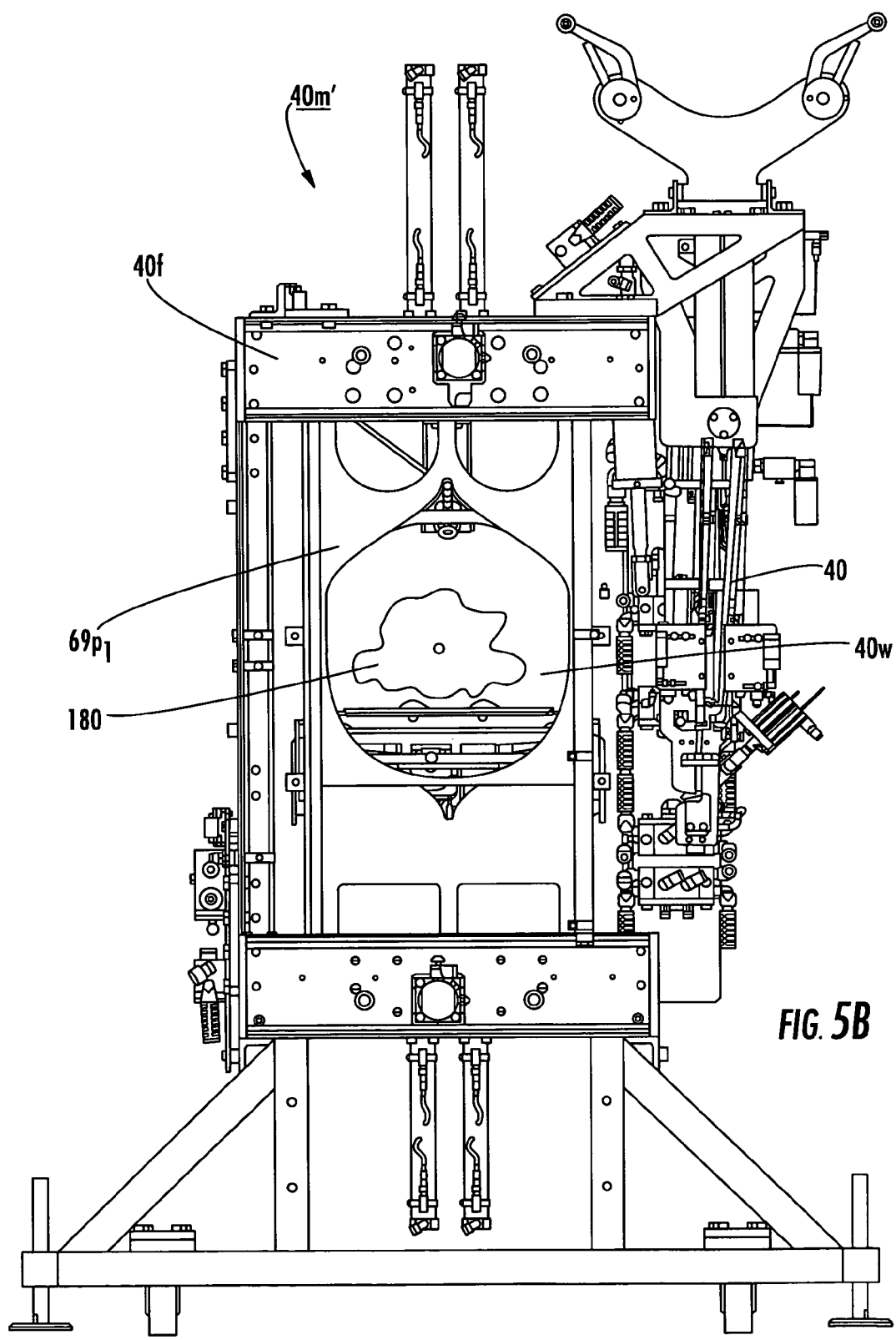
FIG. 5B is an end view (looking downstream) of the module shown in FIG. 5A with the clipper in a home position and the voider mechanism open ready to accept product according to embodiments of the present invention.
Figure 5C:
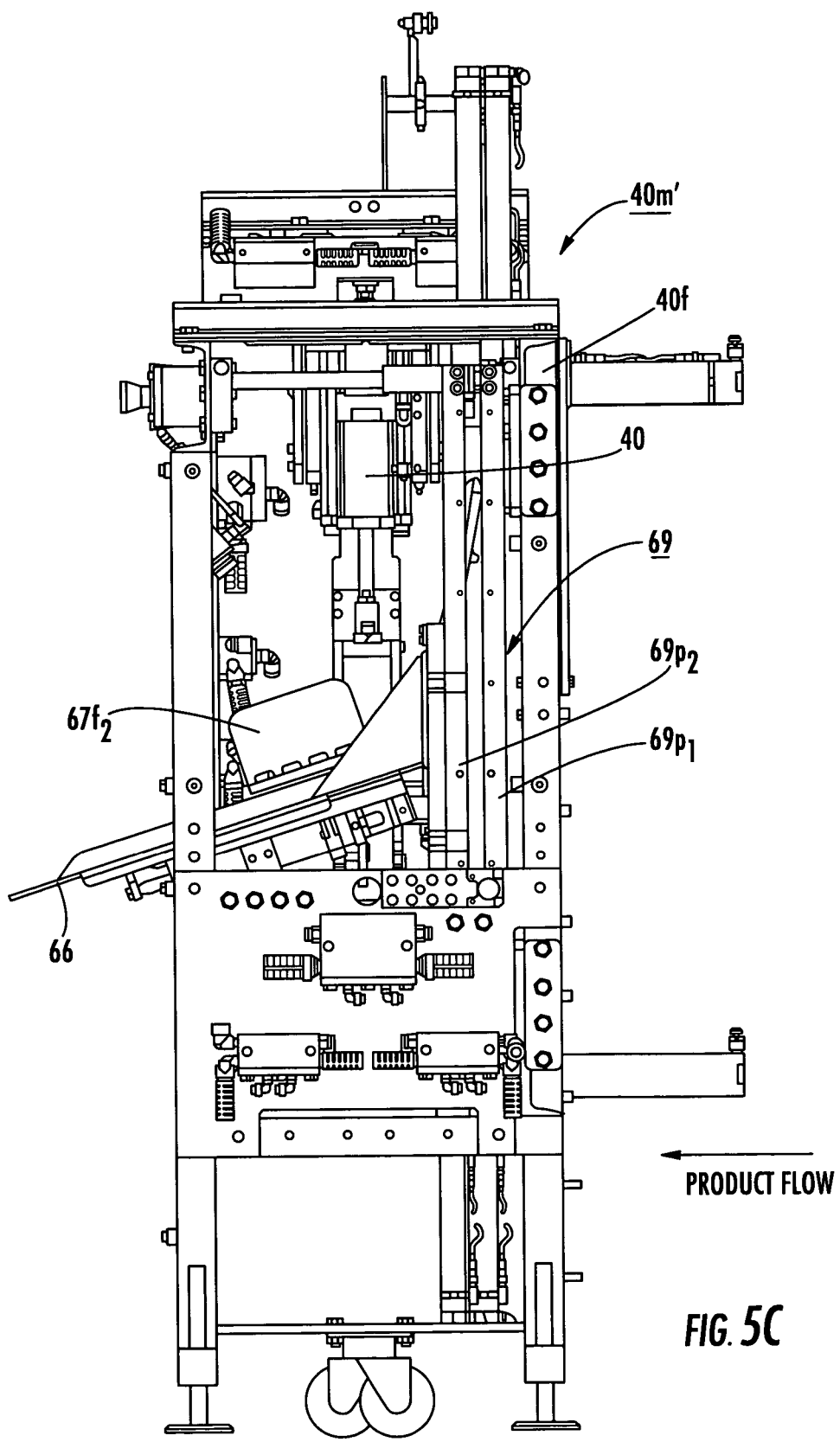
FIG. 5C is a rear view of the module shown in FIG. 5B.

As shown in FIGS. 3A and 5B, the clipper module 40m can include a chute window 40w that receives the discharge end portion of the product chute 30 and holds the product chute in alignment with the clipper 40. As such, the discharge end portion of the chute 30 can reside on the frame 40f (directly or indirectly). The chute 30 can be changed out and replaced as desired to run different products and/or covering. The chute 30 may be configured the same or different from that shown. Typically, the length and/or height of the chute 30 is maintained for replacement chutes within a desired tolerance to reduce any adjustments on the other components. An exemplary length is about 28 inches and the tolerance may be +/−1/16 of an inch.

Figure 8:
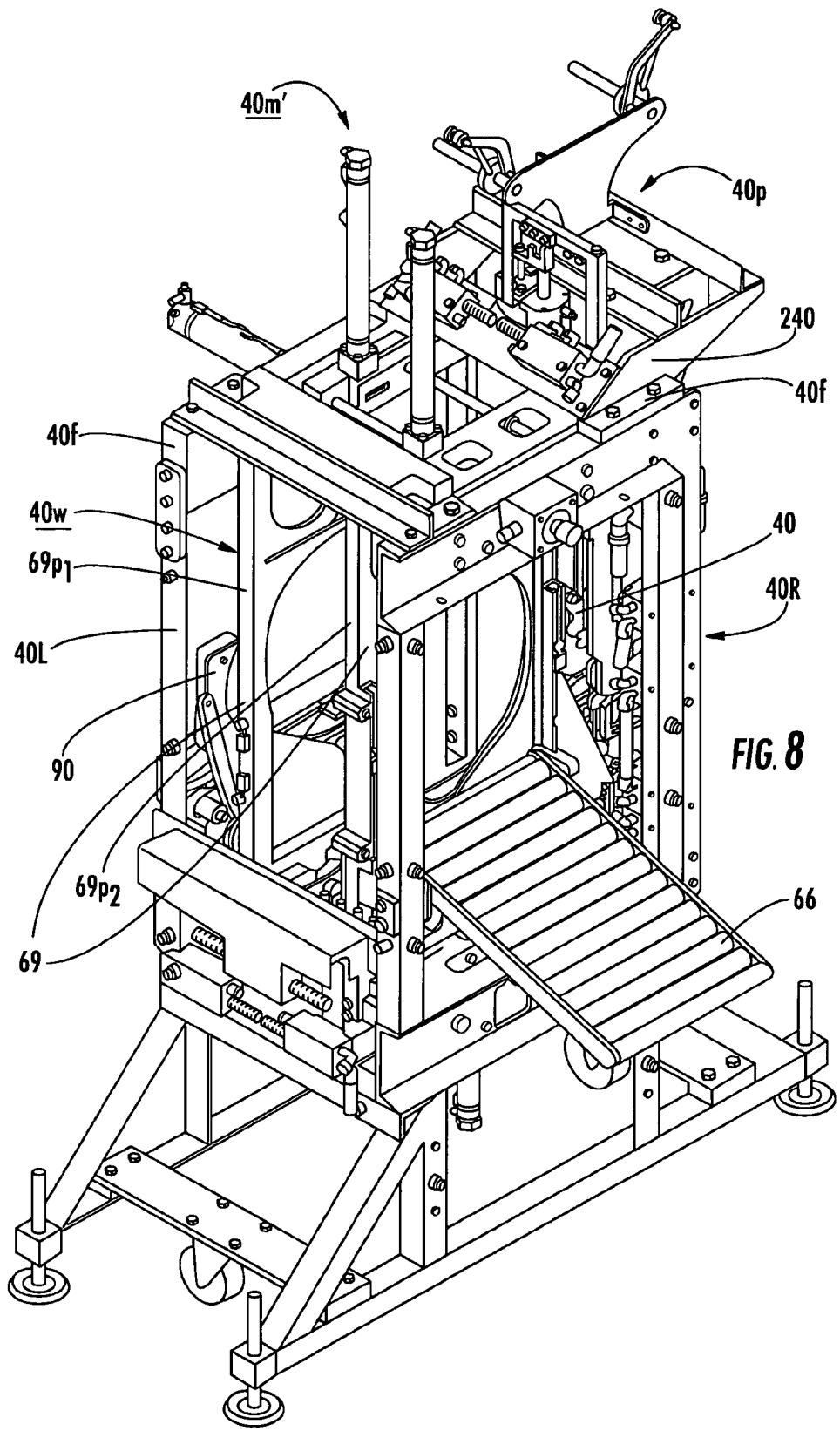
FIG. 8 is a front view of the module shown in FIG. 5A but illustrating the clipper mechanism mounted to the left side of the frame.
Figure 9:
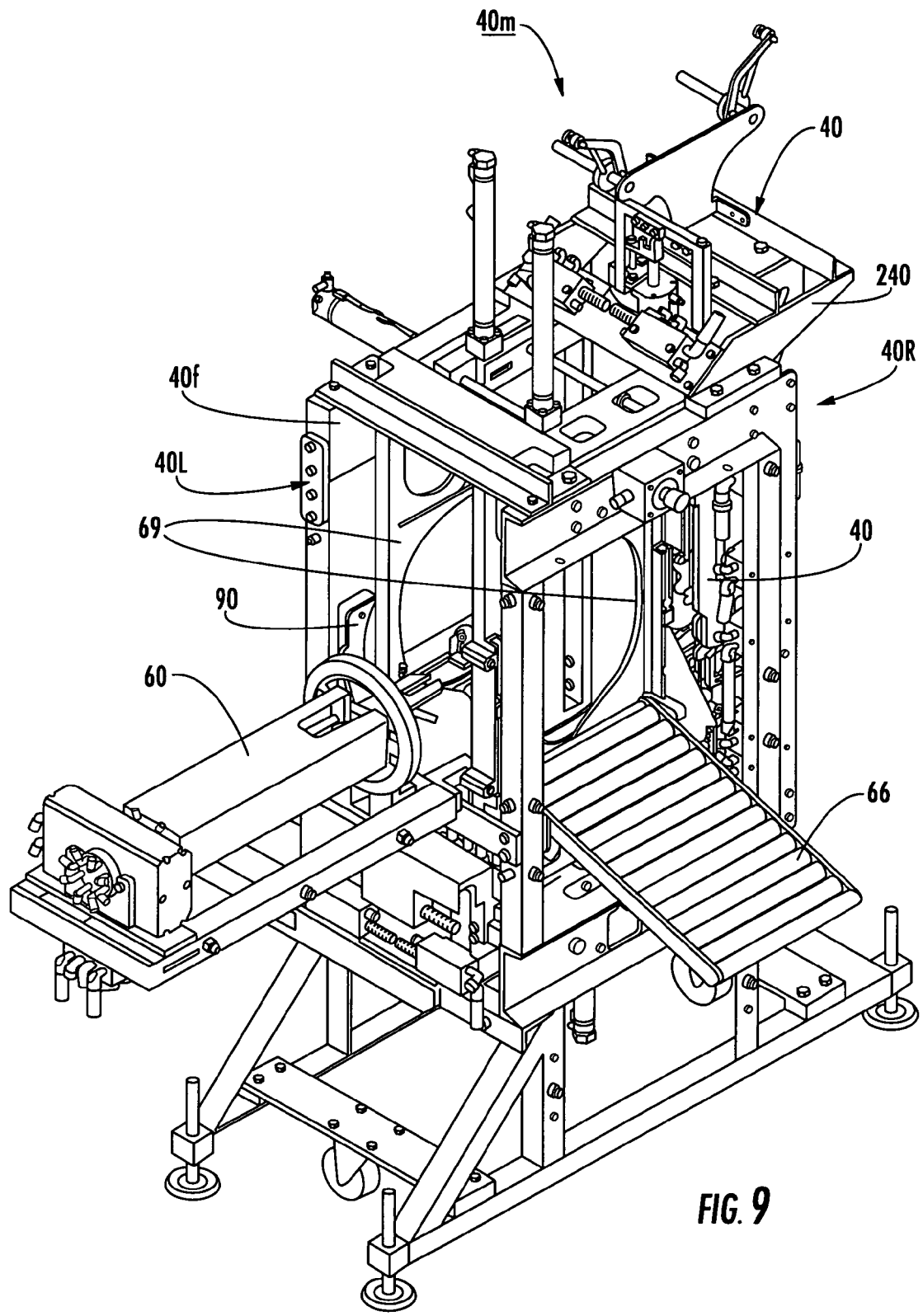
FIG. 9 is a perspective view of a module similar to that shown in FIG. 8 but also including an optional handle-maker.

FIGS. 5A-9 illustrate the modules 40m, 40m' with the housing guards 11 removed. FIGS. 5A-8 show the module 40m' without a handle maker 60 and FIG. 9 shows the module 40m with a handle maker 60. FIGS. 5A-C and 6 also illustrate the clipper 40 mounted to a left side of the frame 40f and FIG. 9 shows the clipper 40 mounted to a right side of the frame 40f. Thus, the modules 40m, 40m' are configured with a frame 40f that allows the clipper 40 to mount to either the right or left hand sides 40R, 40L of the frame 40f and/or to allow the selective assembly of a handle maker 60 (as shown by the module 40m in FIG. 9) or not (shown by the module 40m' in FIGS. 5A-C and 6). As shown in FIG. 5A, the right and left hand sides 40R, 40L of the frame 40f are defined with respect to the axial centerline location of the product primary travel path looking upstream, so that the right hand side 40R of the frame 40f extends from a generally medial position above and/or below the product travel path and rightward therefrom, while the left hand side 40L of the frame 40f extends from a generally medial position above and/or below the product travel path and leftward therefrom. Thus, it will be understood that the right side 40R of the frame 40f is not limited to the rightmost portion of the frame structure and the left side 40L of the frame 40f is not limited to the leftmost portion of the frame structure.

In the embodiments shown in FIGS. 1 and 2, each clipper module 40m can include a clipper mechanism 40, a handle maker 60, a voiding mechanism 69 (FIG. 8) and a brake assembly 90 (FIG. 8). It is noted that the clipper 40 may be referred to herein as a clipper apparatus, clipper module, clipper mechanism, and/or clipper assembly, but each term may be used interchangeably with the others. The module 40m shown in FIG. 1 also includes a printer module 150 with a printer platform 150p. The clipper module 40m shown in FIGS. 1 and 2 includes different discharge trays 66 mounted to the frame, the tray 66 shown in FIG. 1 having a ribbed floor with pivoting flaps and the tray 66 shown in FIG. 2 having rollers. The voiding assembly 69 typically includes two spaced apart plates $69p_1$, $69p_2$ (FIGS. 5B-5C, 8, 9A) that cooperate to move together and apart to help gather and converge the covering material as it is pulled off the chute 30 and/or to void or purge (push) the product from the closure region of the covering material. Typically, the upstream voiding plate $69p_1$ is stationary in the longitudinal direction and the downstream plate $69p_2$ is configured to advance and retreat in the longitudinal direction. The brake assembly 90 can be mounted to the module frame 40f and may be used to apply a braking force to pinch the covering material against the chute 30. Not all modules 40m may require or need the voiding mechanism 69, handle maker 60 (see, for example, FIGS. 6 and 8) and/or brake assembly 90. In some embodiments, gathering plates configured on the clipper mechanism 40 and/or frame 40f may be used in lieu of and/or with a voiding mechanism 69 to gather the covering material for closure.

The clipper module 40m can be a standalone device or be configured to engage a product chute 30 in an upstream portion of an apparatus, such as apparatus 10, 100, to provide increased build options and/or modularity. The portion of the apparatus 10, 100 upstream of the clipper module 40m can also be modularized and/or provide selectable build options for a front-end module to meet customer applications while reducing the need for customer-specific customized equipment.

When the handle maker 60 is not assembled, a generally planar upstanding housing sidewall can be used to close the module 40m. The handle maker 60 and frame 40f can also be configured to allow the handle maker 60 to mount to either the left or right hand side 40L, 40R, respectively, of the frame 40f (and primary product travel path) with their respective housing guards 11 (FIGS. 1 and 2) likewise mountable to either side. The housing guards 11 can include first and second selectable left-hand and first and second right-hand housing sidewall guards for modules 40m, 40m'. The first left hand housing guard can be a generally planar generally continuous upstanding sidewall that is used when the clipper mechanism 40 is mounted on the left hand side of the frame and when the clipper is mounted to the right hand side of the frame with the module 40m' being devoid of a handle maker, and the second can be a generally planar upstanding sidewall with a handle maker window formed therein, such as for module 40m. The first and second right-hand guards can be used for the reverse situations.

Typically, the handle maker 60 (where used) will mount to a different opposing side of the frame 40f from the clipper 40. An example of a suitable handle-maker is described in U.S. Pat. No. 6,729,102, the contents of which are hereby incorporated by reference as if recited in full herein. The handle maker 60 is configured to automatically form a handle on (typically from) the covering material as the product exits the chute 30.

The frame 40f can have pre-formed apertures, brackets, alignment indicia and/or other structures or members that can allow the clipper 40 and/or handle maker 60 to mount to the desired side of the frame 40f without requiring specialized individual frame modifications or brackets for a particular customer. For example, the clipper mechanism 40 can be an assembly with a mounting bracket configuration that can be interchangeably mounted to either side of the frame 40f and still clip at a substantially common location in the product path. The handle maker 60 with the bracket 160 (FIG. 4A) and the printer module 150 with the support bracket 150b (FIG. 4A) can be similarly configured to allow mounting to either side of the frame 40f while providing the desired functional alignment. Thus, the frame 40f and the clipper 40 and/or handle maker 60 as well as the printer module 150 can be modular so as to be assembled to the desired side of the frame during manufacturing assembly to be able to provide several build options to meet a customer's order without customizing each component for each customer. This will allow a decrease in labor, less single-purpose inventory, and/or faster build cycles. For example, a modular frame 40f may have additional apertures over specific use frames. Unused apertures may be sealed, filled or closed for sanitary reasons, such as with fasteners or plugs.

The clipper 40 will typically mount to a top portion of the frame 40f in a manner that allows the clipper 40 to dynamically retract and advance into clipping position as discussed above. For example, as shown in FIGS. 5A, the clipper 40 is mounted to an upper portion of the left hand side of the frame 40f using a coupler member 240. In operation, the clipper 40 moves inward to a desired clip location. The coupler member 240 can alternatively be assembled to the upper portion of the left hand side of the frame 40f allowing the clipper 40 to move inward to substantially the same operative location. In any event, the modules 40m, 40m' are arranged to align with the chute 30 such that the discharge end portion of the product chute 30d terminates proximate the clipper 40. The modules 40m, 40m' are configured to hold the clipper 40 so that the clip window 140w (FIG. 5E) can be generally axially aligned with a desired axial location of the product travel path in the full clip position, typically generally at the axial centerline of the chute 30, irrespective of whether the clipper 40 is mounted to the right or left hand side of the frame 40f.

Figure 4A:
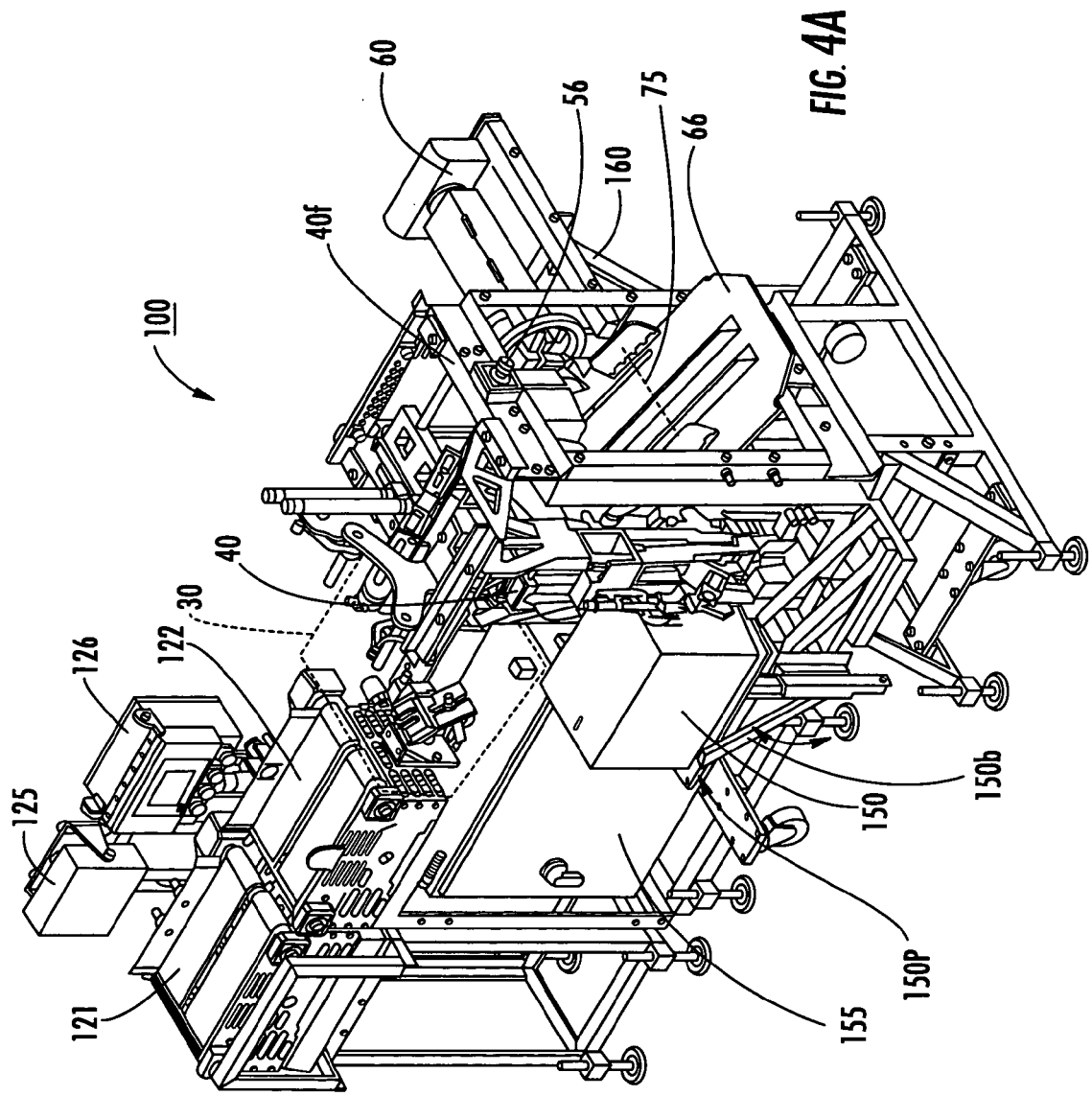
FIG. 4A is a perspective view of the device shown in FIG. 1, illustrated with the housing guards removed.
Figure 4B:
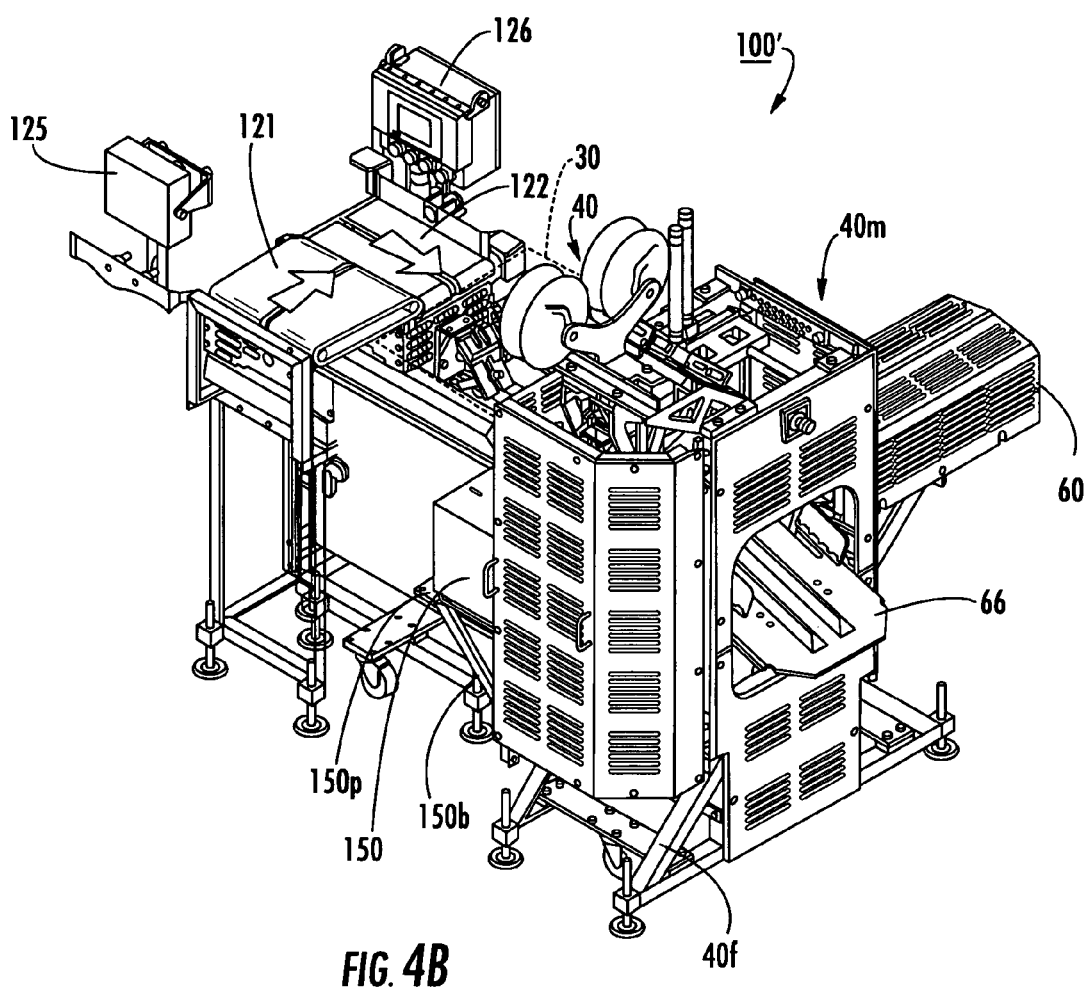
FIG. 4B is a perspective view of an alternate embodiment of the device shown in FIGS. 1 and 4A.

As shown in FIGS. 1 and 4A, the apparatus 100 includes a scale 125 that is in electronic communication with a label printer 150 located downstream of the scale 125 proximate the clipper mechanism 40. As shown, the printer 150 can be mounted on a printer platform 150p that pivots outwardly (as indicated by the arrow as shown in FIG. 1) to allow access to the printer to replace consumable items (such as ink and labels). The printer platform 150p can attach to the modular frame 40f (FIG. 4A). The apparatus 100 can include a moving floor 121 (such as a conveyor) that can be automatically driven to advance a product thereon after a weight is obtained at the scale 125. The product can also be moved by manual means and/or combinations of same. The scale 125 can be in communication with the moving floor 121 and a controller 126. The controller 126 can direct the movement of the floor 121 and/or relay the measured weight to the printer 150 in a queue order. The apparatus 100 can include a second moving floor 122 (such as a second longitudinally aligned conveyor) that delivers the product to the product chute 30. FIG. 4B shows that the apparatus 100' can be configured with offset first and second floors 121, 122, with the first floor 121 configured to travel substantially orthogonal to the primary product travel path and/or the second floor 122. For whole bird or poultry products, the legs thereof may be oriented on the first floor 121 to align with the primary product travel path so that the legs are oriented in a desired packaging orientation as the product enters the product chute 30. In any event, the product then travels through the chute 30 and is enclosed in a covering material as it exits the chute 30 and enters the clipper module 40m.

As shown in FIGS. 2 and FIGS. 3A-3C, the apparatus 10 includes a product pusher assembly or mechanism 20, a product chute 30, and a clipper 40. As shown, the apparatus 10 may optionally include an infeed conveyor 50. Optionally, the apparatus 10 may also include a handle maker 60. FIG. 2 illustrates the apparatus 10 with examples of housing guards 11 disposed over certain functional components. FIG. 3A illustrate the apparatus 10 without the housing guards 11. In the embodiment shown, the apparatus 10 can be described as a horizontal automatic clipping packaging apparatus as the product is primarily moved, processed, clipped and packaged in a horizontal plane. However, certain components, features or operations may be oriented and/or carried out in other planes or directions and the present invention is not limited thereto. For example, the product chute 30 and/or the conveyor 50 may be configured to incline similar to one embodiment of the chute 30 mounted on the apparatus 100 shown in FIG. 1.

The arrows in FIGS. 1 and 2 toward the product chute 30 and clipper 40 indicate the primary direction of product flow. In addition, although the downstream direction 10d is shown as in a direction that extends from left to right (with the upstream direction in the opposing direction), the apparatus 10, 100 can be oriented to run generally right to left and/or in a direction that is into or out of the paper.

Additional description of examples of the different apparatus can be found in co-pending, co-assigned U.S. applications identified by, the contents of which are hereby incorporated by reference as if recited in full herein.

FIGS. 1 and 2 also illustrate a human machine interface ("HMI") station 55 that houses operational switches or components (and typically the controller) that an operator can access to operate the apparatus 10, 100. The apparatus 10 of FIG. 2 includes a product transfer zone 65, which is the location where a product (or products) is positioned, intermediate the product pusher assembly 20 (in the retracted position) and the product chute 30, and substantially aligned with the internal cavity 30c (FIG. 3B) of the product chute 30. This positioning of the product in the flow path and/or alignment with the product chute cavity 30c can be carried out substantially automatically as will be discussed further below. However, a target product undergoing packaging can also be manually introduced or placed into the flow path and subsequently processed.

In operation, the product pusher assembly 20 linearly retracts and advances to push a product through the product chute 30 so that the product is positioned proximate the clipper 40, then retracts to a resting state upstream of the product transfer zone 65. As described above, a sleeve of covering material (designated at feature 130 in FIG. 3A) can be positioned about the external surface of the product chute 30 and configured to be drawn downstream thereof so as to automatically encase the product as the product emerges from the discharge end 30*d* of the product chute 30. A supplemental sleeve material holder may also be used instead of placing the sleeve of casing material on the product chute. The supplemental sleeve holder can be configured to surround a downstream portion of the product chute (not shown). The sleeve of covering material may be sized to stretch to substantially conform to the external wall or surface of the product chute 30 or may be more loosely held thereon. The cavity of the product chute 30*c* may be sized to snugly contact or squeeze opposing portions of the product (side to side and/or top to bottom) as the product is pushed therethrough or may be oversized with respect to the product so that the product loosely travels therethrough.

In operation, the sleeve of covering material may be clipped, welded, fused, knotted or otherwise closed and sealed at a leading edge portion thereof. When the product exits the product chute 30, it is held in the covering material as the covering material is drawn downstream. The covering material may be loaded onto the product chute 30 and the leading edge portion thereof closed before or after the product chute 30 is mounted to the apparatus 10, 100.

Figure 3B:
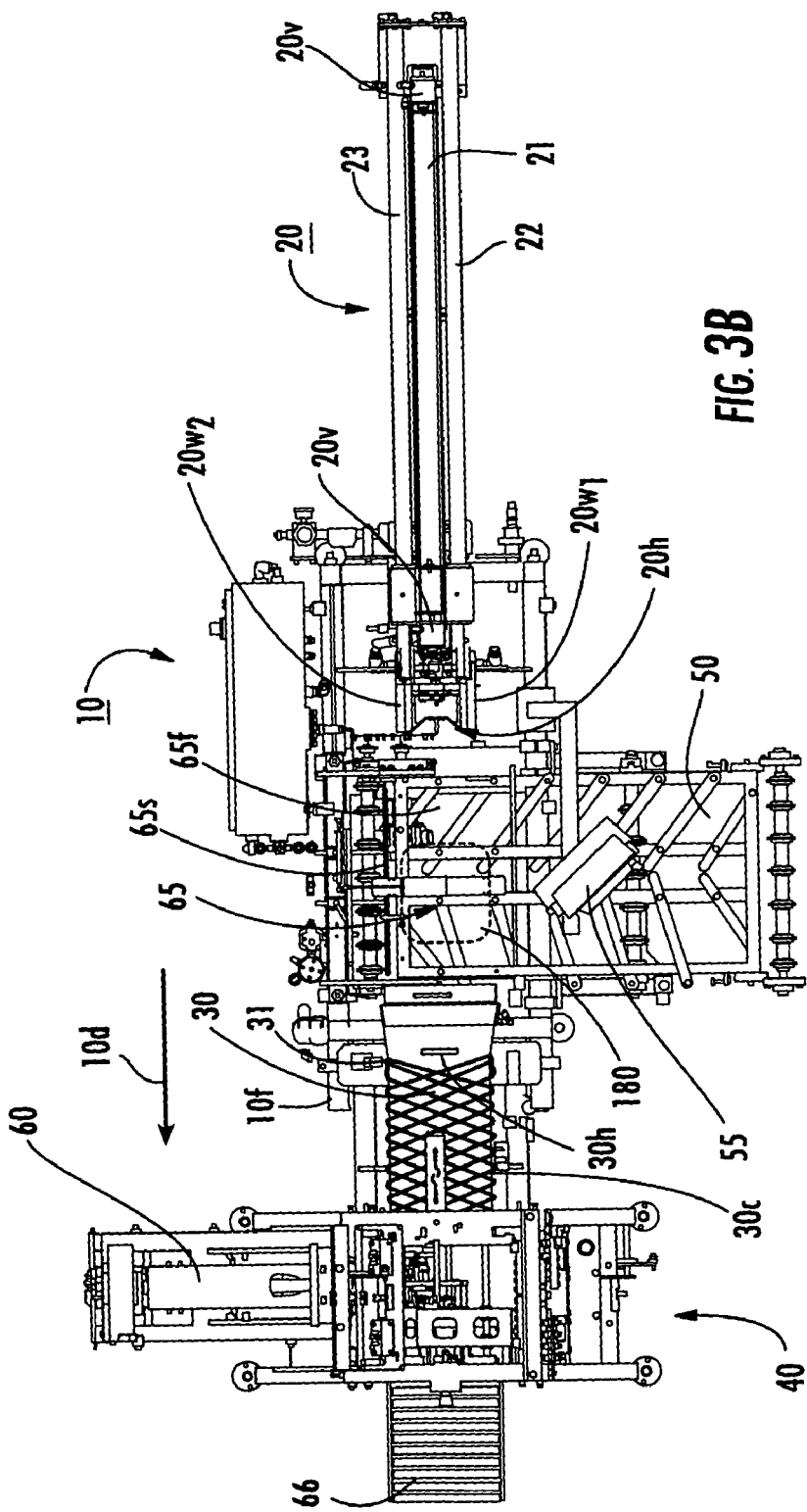
FIG. 3B is a top view of the apparatus shown in FIG. 3A, illustrated with the housing guards removed.

Referring to FIGS. 3A and 3B, the product pusher mechanism or assembly 20 has a pusher head 20*h* that contacts the product and pushes the product downstream through the product chute 30. After the product exits the product chute 30, the downstream portion or leading edge of the product in the covering material can be held in position proximate the clipper 40. In certain embodiments, the product can be held by a retractable product holding member disposed downstream of the clipper 40 to inhibit the product from migrating downstream, thereby holding the product in the covering material between the product holding member and the discharge end of the product chute 30 during the clipping operation. As shown in FIG. 2, the apparatus 10 can include a discharge tray 66 that receives the clipped and packaged product after clipping. In the embodiment shown in FIG. 2, the tray 66 comprises a floor of rollers. Other discharge tray configurations may also be used, such as, but not limited to, the one shown in FIG. 1.

The product pusher assembly 20 has a pusher head 20*h* that is adapted to contact the product. The pusher head 20*h* may be configured to substantially fill the entire cross-sectional width of the product chute cavity 30*c* as the pusher head 20*h* approaches and/or exits the discharge portion of the product chute 30*d*. The clipper 40 is configured to reside in a retracted position out of the product travel region to allow the enclosed product to pass unimpeded until the product rests against a product-holding member (which typically moves between active and inactive positions about the product travel path).

Figure 6:
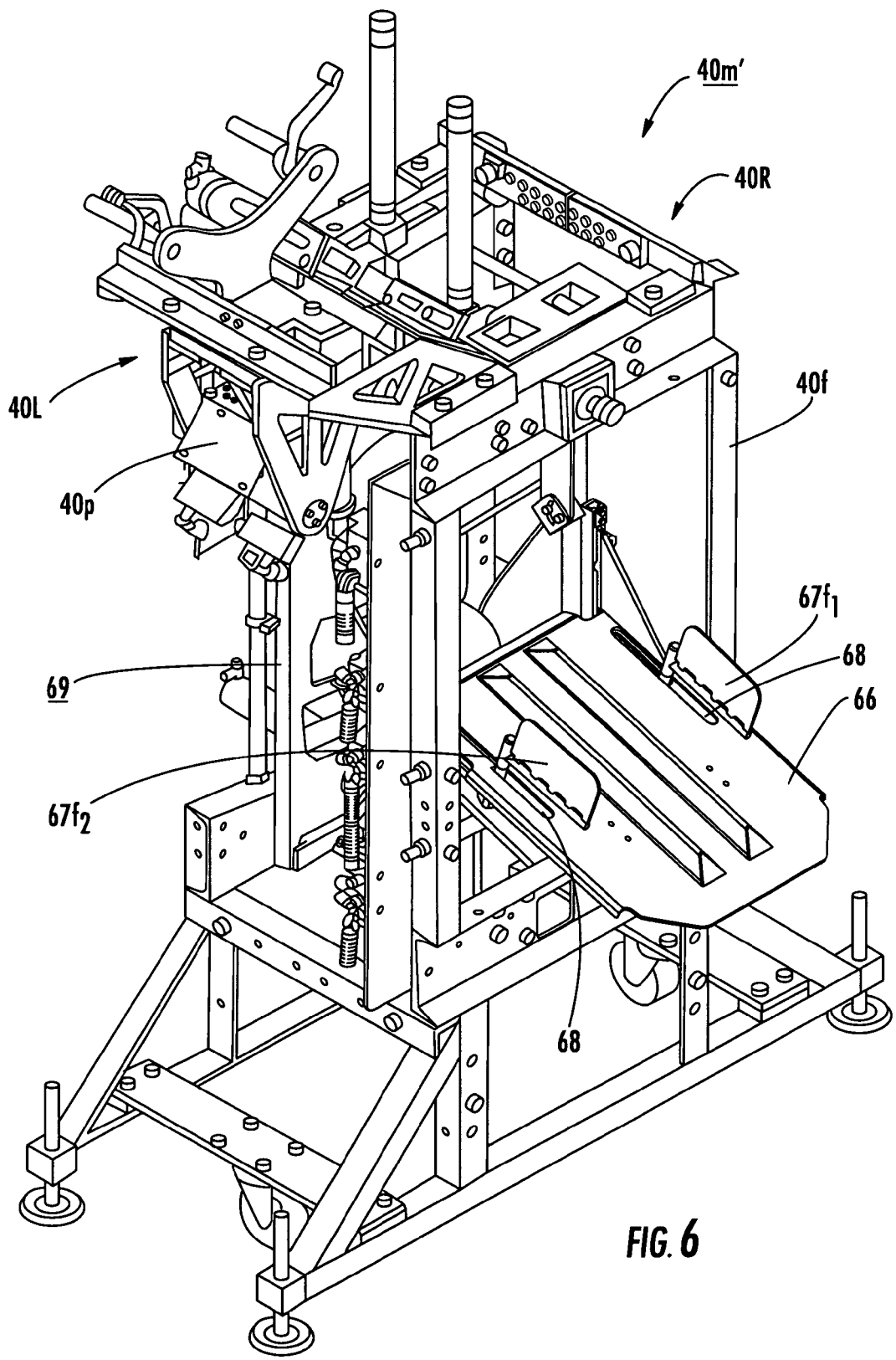
FIG. 6 is a perspective view of the module shown in FIGS. 5A illustrating a clipping mechanism in a full clip position.
Figure 7:
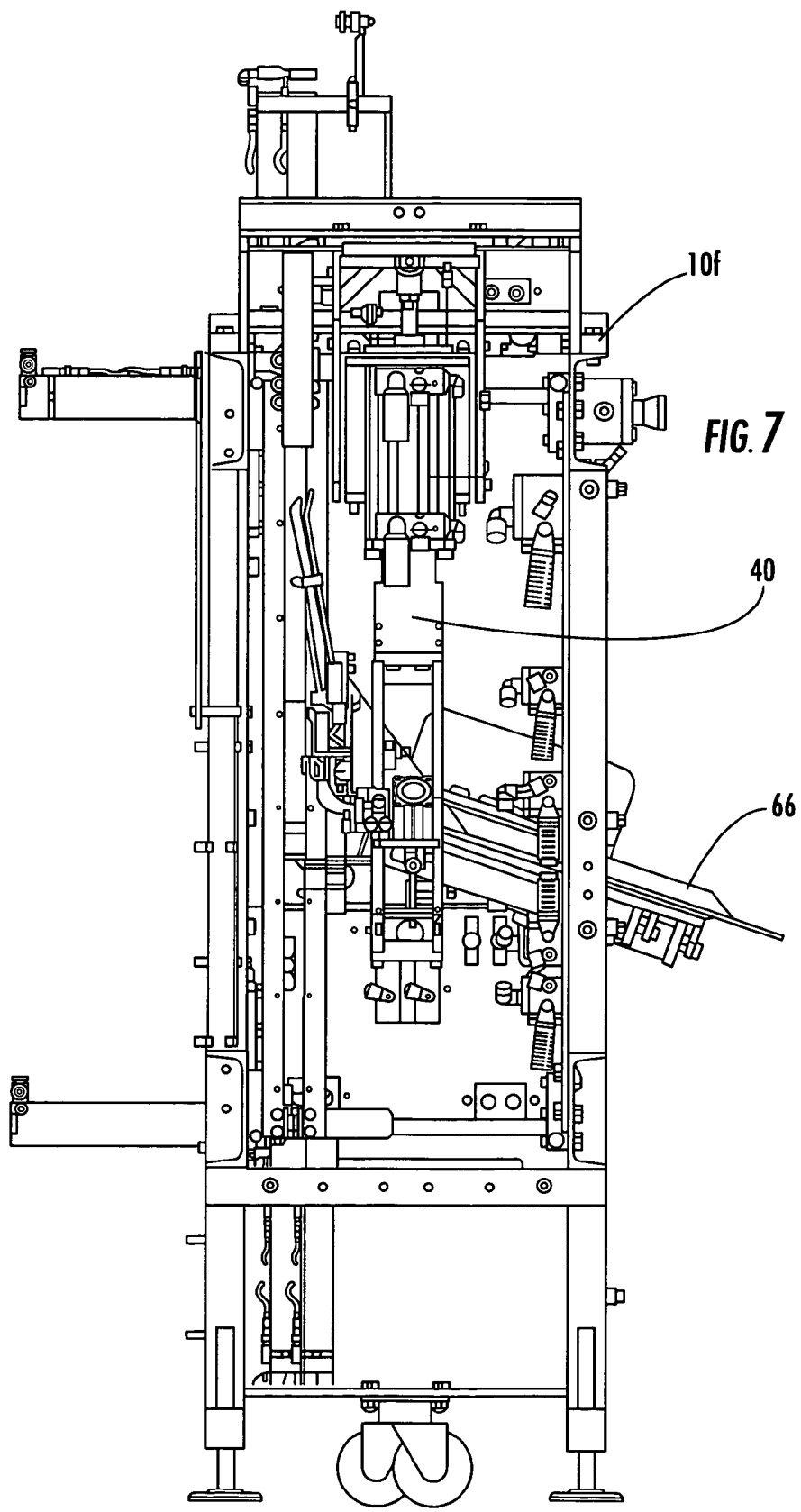
FIG. 7 is a front view of the module shown in FIGS. 5A and 6.

As shown, in FIGS. 5A and 6, the clipper 40 can be pivotably mounted at a pivot 40*p* to the modular frame 40*f* and sized and configured to automatically and controllably actuate (via a pneumatic or fluid cylinder) to advance into a clipping position after the product is in position downstream thereof, then clip the covering material and retract to await to clip the next covering material for the next enclosed product. FIG. 5A illustrates the clipper 40 in a generally upright "home" position and FIG. 6 illustrates the clipper 40 pivoted inward to an angled "full-clip" position with the voider mechanism 69 plates separated and closed in preparation of the clip being applied to the gathered covering (netting). The clipper 40 may operate in response to data from a proximity sensor that is positioned to detect when a product is ready for clipping and provide the data to a controller or processor. The proximity sensor may be positioned at any suitable place to indicate when the product is in position. The proximity sensor can be an optical sensor (infrared, photosensor, or the like), a Hall-Effect sensor, a magnetic sensor, an inductive sensor, and/or any other suitable sensor. The clipper 40 can be attached to a clipper rotation rotary actuator that can control the movement of the clipper 40 during use.

In some embodiments, the clipper mechanism 40 can operate with an automatic stroke cycle that comprises three dwell positions: a first retracted home position; a second pre-clip position; and a third clipping ("full-clip") position. As noted above with respect to FIG. 5A, when in the home position, the clipper body is retracted out of the product travel path. In the third full-clip position, as shown in FIG. 6, the clipper travels inward and is generally oriented with the clip window disposed in the product travel path, typically so that the clip window is generally aligned with the axial centerline of the product chute 30 (not shown). In certain embodiments, the second position of the clipper mechanism 40 can be between about 50-75% of the stroke distance between the first and third clipper mechanism positions, typically at about 75% of the stroke distance. The travel from the first home to the second pre-clip position can be carried out as the product is exiting the product chute 30 to save the cycle time that it would take to clip the product while waiting for the clipper to travel the full "home to clip" position cycle. For example, where a handle maker 60 is used (the handle maker being an optional device and/or operation and may reside upstream of the clipper), the clipper mechanism 40 can advance from the home to the pre-clip second position during the handle-making operation. It is noted that the dwell times in each position can be different. The home dwell time may have the longest duration in any stroke cycle.

Figure 5D:
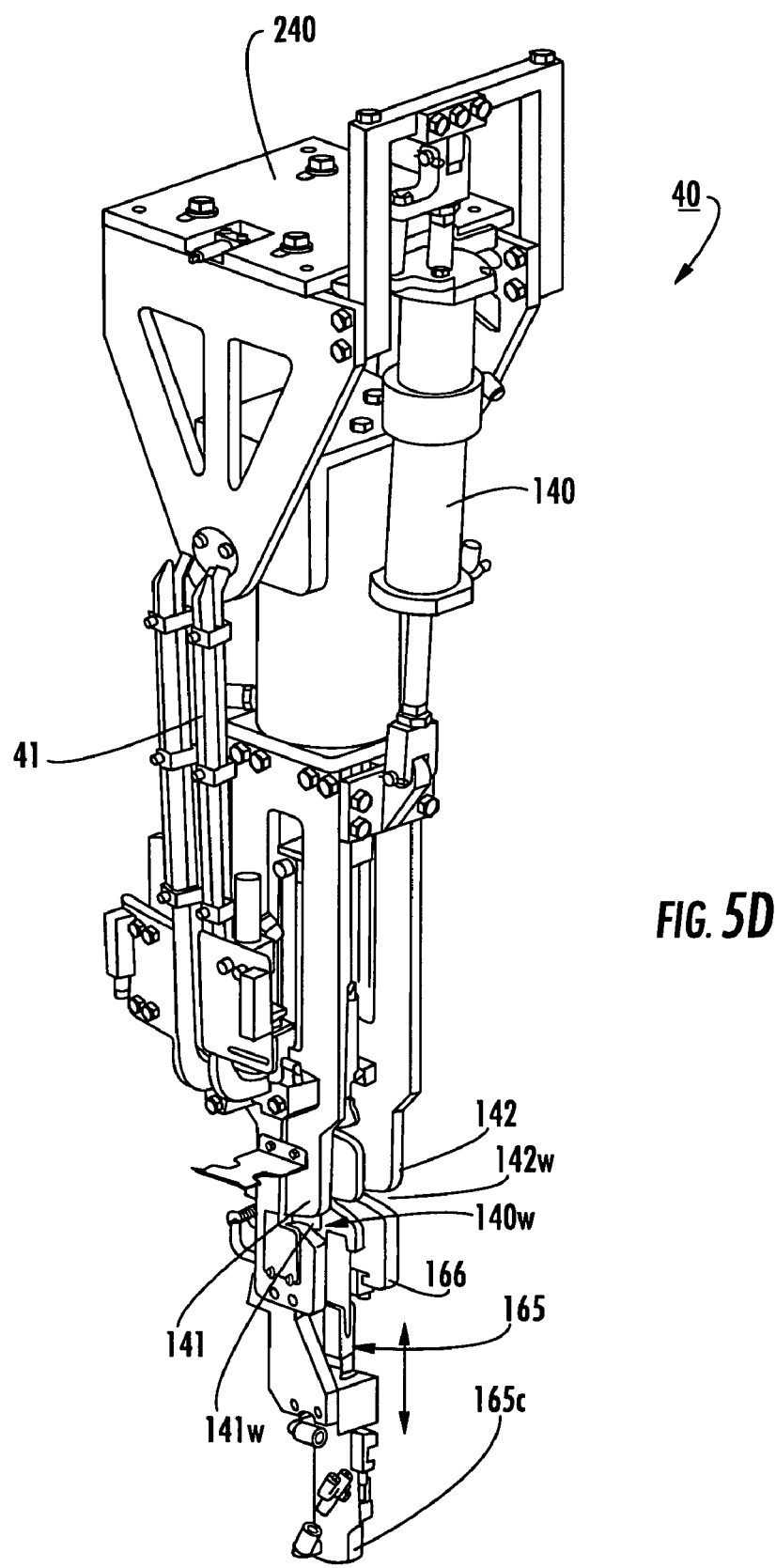
FIG. 5D is a perspective view of a clipper mechanism according to embodiments of the present invention.

The clipper mechanism 40 can include an integrated double two-stroke actuation cylinder 140 as shown in FIG. 5D that controllably and serially advances the clipper mechanism from the first (home) position, to the second (pre-clip) position, and the third (full clip) position, then back to the pre-clip or first (home) position.

FIGS. 3A-3C illustrate that the product pusher assembly 20 can include a product pusher cylinder 21 and two product pusher guide rods 22, 23, respectively. The product pusher guide rods 22, 23 can be positioned on opposing sides of the pusher cylinder 21 and help to stabilize (i.e., provide an anti-rotation structure) for the pusher head 20*h* as the pusher head 20*h* travels, particularly when it travels outside the product chute 30.

As shown in FIGS. 3B, the pusher assembly 20 can include at least one, illustrated herein as two, 3-way power valves 20*v*, one positioned on each end portion of the cylinder 21. The product pusher assembly 20 can also include at least one pressure regulator and an air source in communication with the cylinder 21. In operation, the pressure regulator can allow the cylinder 21 to operate at up to about 80 psi (653 lb$_f$). The cylinder 21 may be operated at a substantially constant fixed pressure of between about 50-80 psi. In certain embodiments, the pressure is maintained at about 80 psi to allow the pusher 20 to push the product through the chute 30 even when the product is slightly oversized, thereby shaping the product as it travels through the chute 30. The bore size of the cylinder 21 may be about 3.25 inches. This shaping may be particularly suitable for whole or partial hams, including bone-in hams as such a shaping operation may form increased numbers of center slices.

As shown, the control housing 155 (FIGS. 3C and 4A) can hold system valves, pressure transducers, actuator controls, a processor that directs the automated operations of the apparatus 10 (which may also be held in total or partially in the HMI 55) and other electronic, software and/or mechanical equipment as will be understood by one of skill in the art. The HMI 55 may include a touch screen interface/user input.

FIG. 3B illustrates the product transfer zone 65 that can have a ceiling or lid 65c (FIG. 2) that overlies the floor 65f and a sensor 61 (FIG. 2) held above the floor 65f (typically in the ceiling 65c). The underlying product pusher assembly 20 is shown retracted with the pusher head 20h upstream of the product chute 30. The ceiling 65c may be pivotably mounted 65p to the frame of the apparatus 10 to allow an operator easier access to the transport zone 65 for clearing misfeeds and the like. The sensor 61 can be an ultrasonic sensor configured to identify when a product is in a suitable deployable position in the underlying space of the product transfer zone 65. This data can be fed to a controller that can then timely activate the actuation cylinder 21 to advance the product pusher assembly 20. In operation, if an expected product is not delivered to the product transfer zone 65 within a predetermined time, a timing circuit (typically included in the machine control logic program code) can automatically stop the infeed conveyor 50. An operator can restart the apparatus 10 by depressing the start pushbutton.

FIGS. 3B and 3C also show a stop member 65s that can move toward the conveyor 50 to help align the incoming product 180 on the primary travel path, so that the center of the product is generally aligned and in line with the axial centerline of the product chute 30. The stop member 65s can be a plate that is dynamically moveable transversely or laterally in and out in response to a determination that product is in position in the transfer zone 65, such as via direction of the controller based on a signal from the proximity sensor 61. FIG. 3C shows that the stop member 65s can be a generally vertically oriented elongate stop plate in communication with at least one (shown as two) adjuster rods 65r to allow the apparatus 10 to adjust the position and/or travel distance to accommodate different size in-feed conveyors 50 as well as different sized chutes 30 and/or products.

FIG. 3B illustrates a product 180 on the floor 50f of the conveyor 50 and positioned in the product transfer zone 65. The product 180 is stopped by the product stop plate 65s from progressing out of alignment with the outer perimeter of the chute 30 so that the product is in communication with the inlet portion of the chute 30 and so that the product pusher assembly 20 will be able to push the product 180 axially downstream through the product chute 30 substantially about the chute axis.

It is noted that in lieu of and/or with the conveyor 50 of apparatus 10 or floors 121 and/or 122 of apparatus 100, other floor configurations, typically moving floors or product advancement systems may be used, for example, rollers, rolling bars, belts or drives that advance trays or other support members and the like). In addition, the moving floor may be angularly oriented to travel up, down, or otherwise to advance the product. In addition, the apparatus 10, 100 can include an automated continuous advancement system with discrete product(s) separated at desired intervals on the moving floor to serially introduce product for packaging to the chute 30. In certain embodiments, the moving floor can include partitions, channels, or other spacer configurations to hold the product(s) in desired alignment on the moving floor so that, when the proximity sensor indicates the product is present, the partition or channel provides the desired product stop.

For groups of objects, manual or automated bins or feeders can accumulate the desired amount of grouped objects upstream and place them together on the moving floor (not shown). In other embodiments, an automated counter can be used to count the number of products that pass a target location so that a desired number of products are accumulated (not shown). The conveyor 50 (FIG. 2) and/or 122 (FIG. 1) and chute 30 may be configured to have a gap or bridge space therebetween, depending on the size of the conveyor. In certain particular embodiments, a gap space of about 2.5 inches extends in the axial direction between the conveyor 50 and/or 121 and the chute 30.

The apparatus 10, 100 may include a sensor positioned proximate the receiving end of the product chute 30. The sensor can be configured to confirm that the product chute 30 is in operative position. An exemplary sensor is a two-part magnetic switch 31 as shown in FIG. 10D; one part can be positioned on a mounting bracket attached to a chute bracket and the other part held on the mounting frame 10f. When the two matable parts of the switch engage, the chute 30 is determined to be in proper position. Other types and/or additional sensors may also be used as suitable as is known to those of skill in the art.

A controller/processor (such as a Programmable Logic Controller) may be configured to monitor a signal from this sensor 31 and deactivate the product pusher assembly 20 (release cylinder pressure) automatically whenever a product chute 30 position-error is noted at any time during the process. The signal can be automatically monitored through a Safety Circuit Module. If the product chute 30 is missing or out of position, the apparatus 10, 100 can be held in a low energy state that removes power to air supplies and controls to inhibit machine operation. To reinitiate the procedure, an operator may press a restart or reset button. In certain embodiments, the clipper 40 may be operated on override even when the chute 30 is absent. Once the product chute 30 is in location and the stop is reset, power air can be applied to the machine control valves and electric power can be applied to the control (PLC) outputs. After the PLC determines the positions of the moveable components, such as the product pusher assembly 20, the clipper 40, the product holding member and the like, an automatic reset can be performed and those components automatically moved to a respective home position as needed.

The HMI 55 can include an input display screen, an emergency stop button, a reset button and a clipper only activation button. The HMI can also include a pressure regulator for corresponding gages. The pressure regulators can be for the retractable product holding member on a discharge tray (which may be described as a product clamp bar), and/or one for a retractable brake system 90 (FIG. 9), typically used to selectively apply brake pressure to the covering material proximate the discharge end portion of the product chute 30.

The apparatus 10, 100 may be configured to allow the clipper 40 to operate irrespective of the upstream devices using the "clipper only" push button instead of the apparatus-start push button. Alternatively, the modules 40m, 40m' can be stand-alone devices that operate the clipper 40. The HMI 55 and/or modules 40m, 40m' can also include an emergency stop 56 (FIG. 4A) and reset pushbutton or other type of switch as shown.

In some embodiments, the product pusher mechanism 20 is configured to limit the travel of the pusher head 20h so that at least a portion of the pusher head 20h remains inside the product chute 30 at a furthermost operative extension position (extended position) of the product pusher mechanism 20. In other embodiments, the forward portion of the pusher head 20h passes out of the chute 30 downstream of the gathering plates while in others, the pusher head 20h stops short of the most downstream gathering plate (the gathering plates will be discussed further below). In operation, the pusher head 20h is configured to push the product from the discharge end of the chute 20d so that the covering material extends a sufficient distance therefrom to allow an automated clipping operation to be carried out.

Referring to FIG. 3B, the product pusher mechanism 20 comprises a pair of spaced apart elongate guidewalls $20w_1$, $20w_2$ positioned on opposing sides of the forward portion of the pusher head 20h to help guide the pusher head in the product chute 30. The guidewalls $20w_1$, $20w_2$ may have a length that is less than the length of the product chute 30. The guidewalls $20w_1$, $20w_2$ may each connect (directly or indirectly) to a guide rod 23, 22, respectively. The guiderods 22, 23 may be symmetrically arranged with respect to the intermediately located pusher cylinder 21. The product pusher assembly 20 can operate using a fluid-actuated cylinder 21 (typically a pneumatic cylinder) that is longitudinally mounted on the apparatus 10 and extends in the axial direction. The centerline of the cylinder 21 may be aligned with the product chute centerline 30. The two guide rods 22, 23 can be stainless steel guide rods mounted in a linear ball bearing block assembly. As noted above, the guide rods 22, 23 can act as an anti-rotation stabilizer for the product pusher assembly 20 and/or help guide the assembly 20 to travel in a substantially straight line through the product chute 30 as the assembly 20 travels repetitively through extended and retracted configurations.

Referring to FIG. 3B, the guidewalls $20w_1$, $20w_2$ and/or the forward portion of the pusher head 20h may be formed of and/or coated with a non-stick material (and/or lubricant) such as TEFLON polymer. In particular embodiments, such as for packaging of meat, the guidewalls $20w_1$, $20w_2$ may be formed of acetyl while the forward portion 20p can be formed of stainless steel.

Figure 10B:
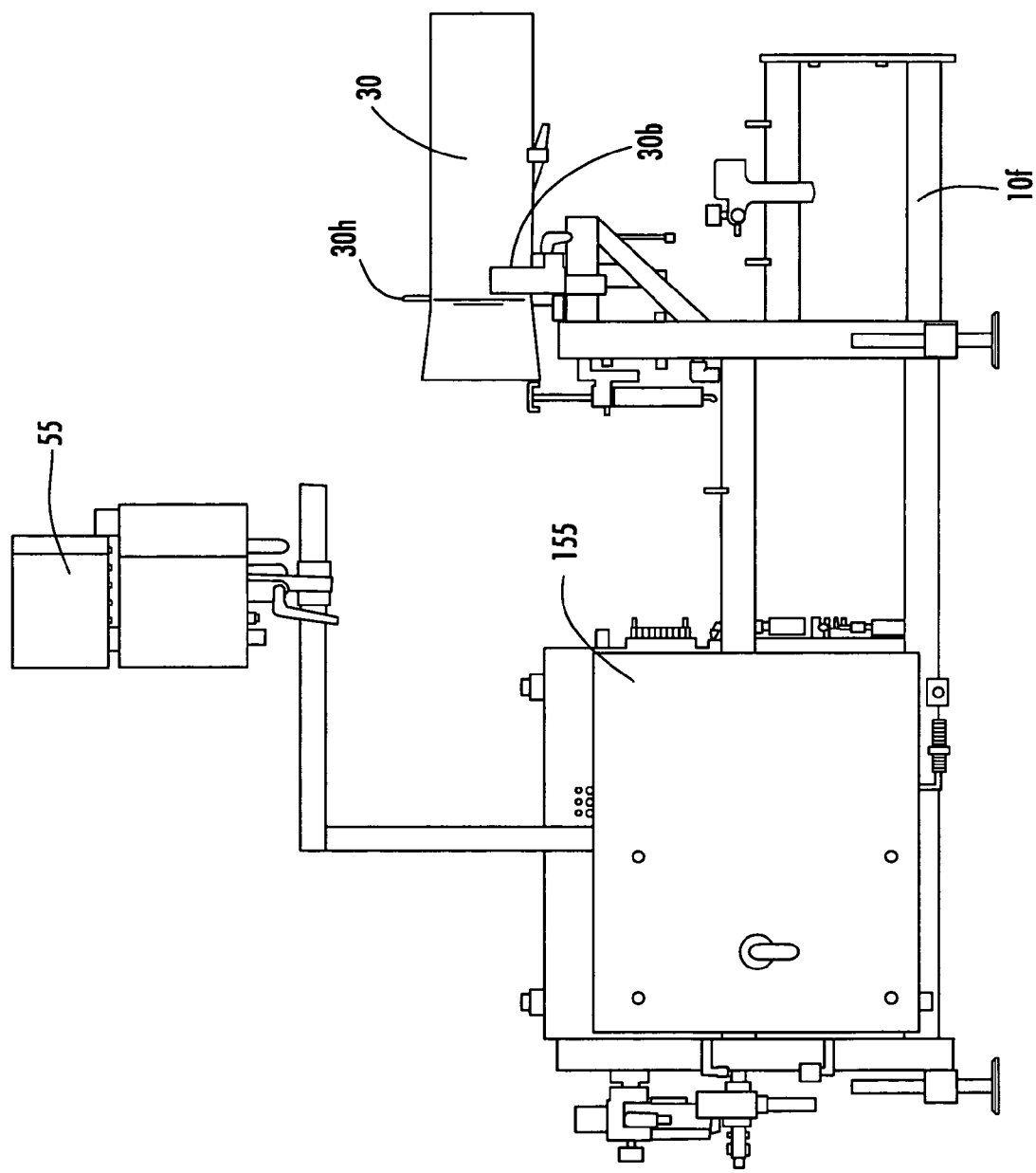
FIG. 10B is a rear view of the module shown in FIG. 10A.
Figure 10C:
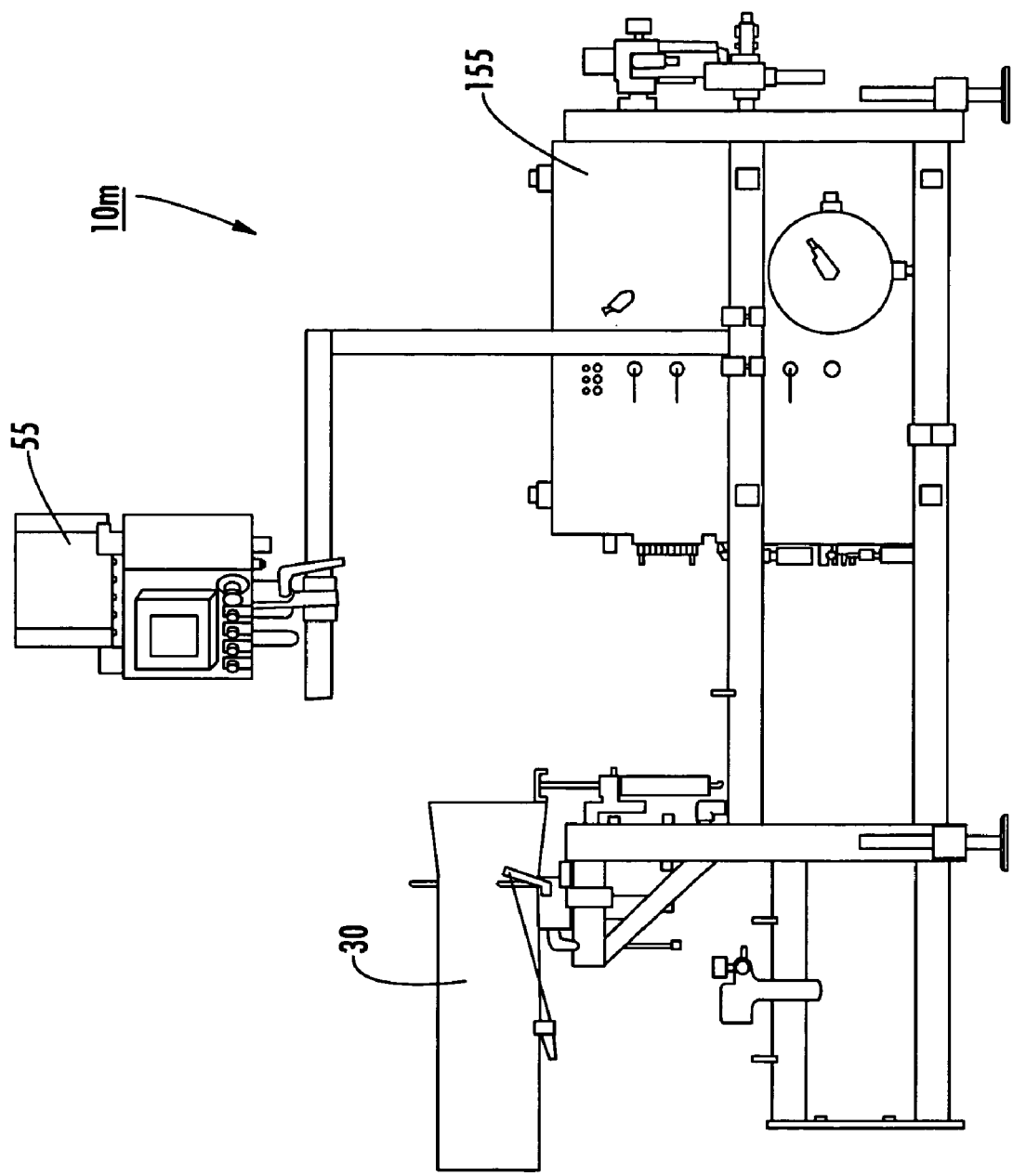
FIG. 10C is a front view of the module shown in FIG. 10A.
Figure 10D:
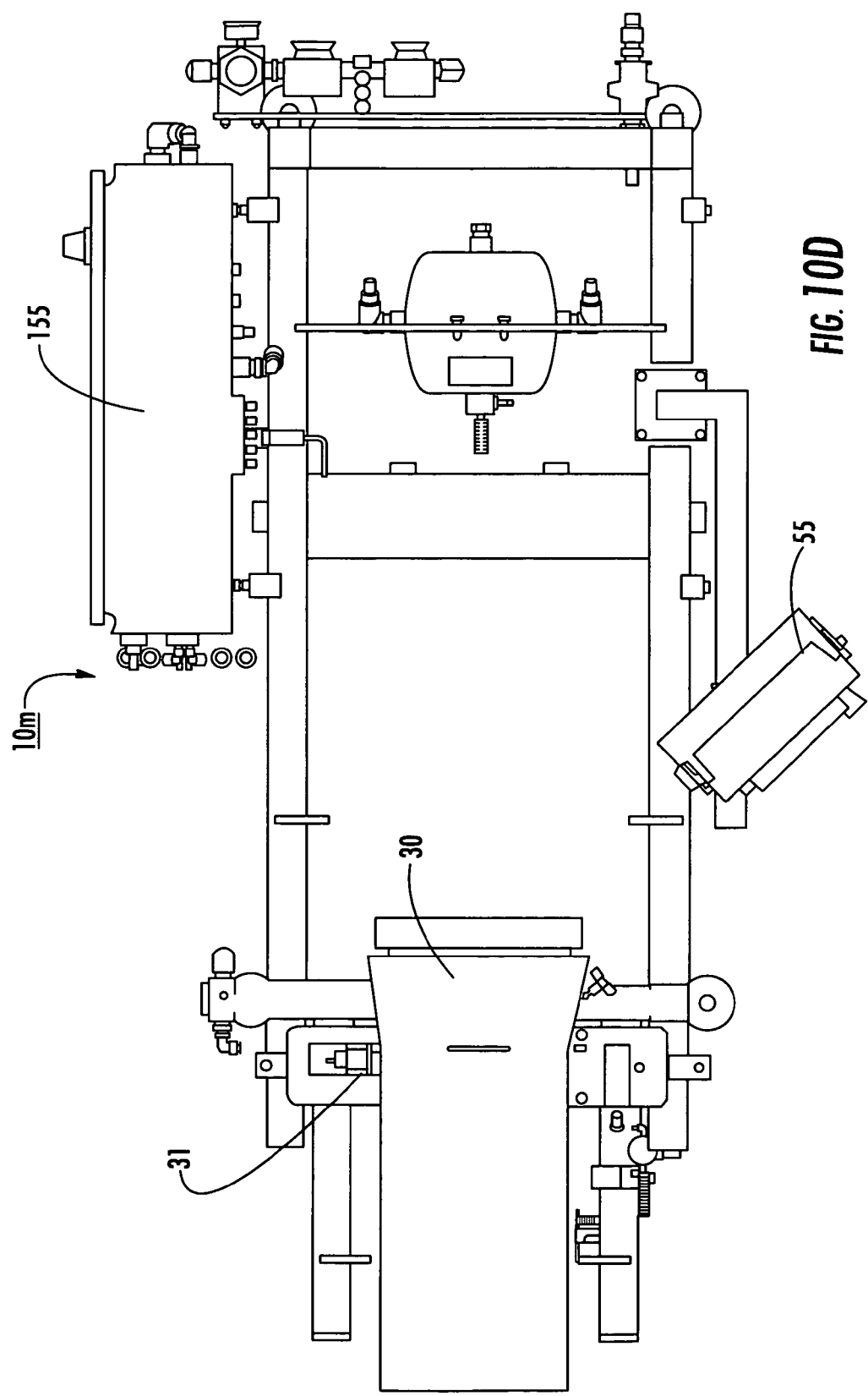
FIG. 10D is a top view of the module shown in FIG. 10A.
Figure 10E:
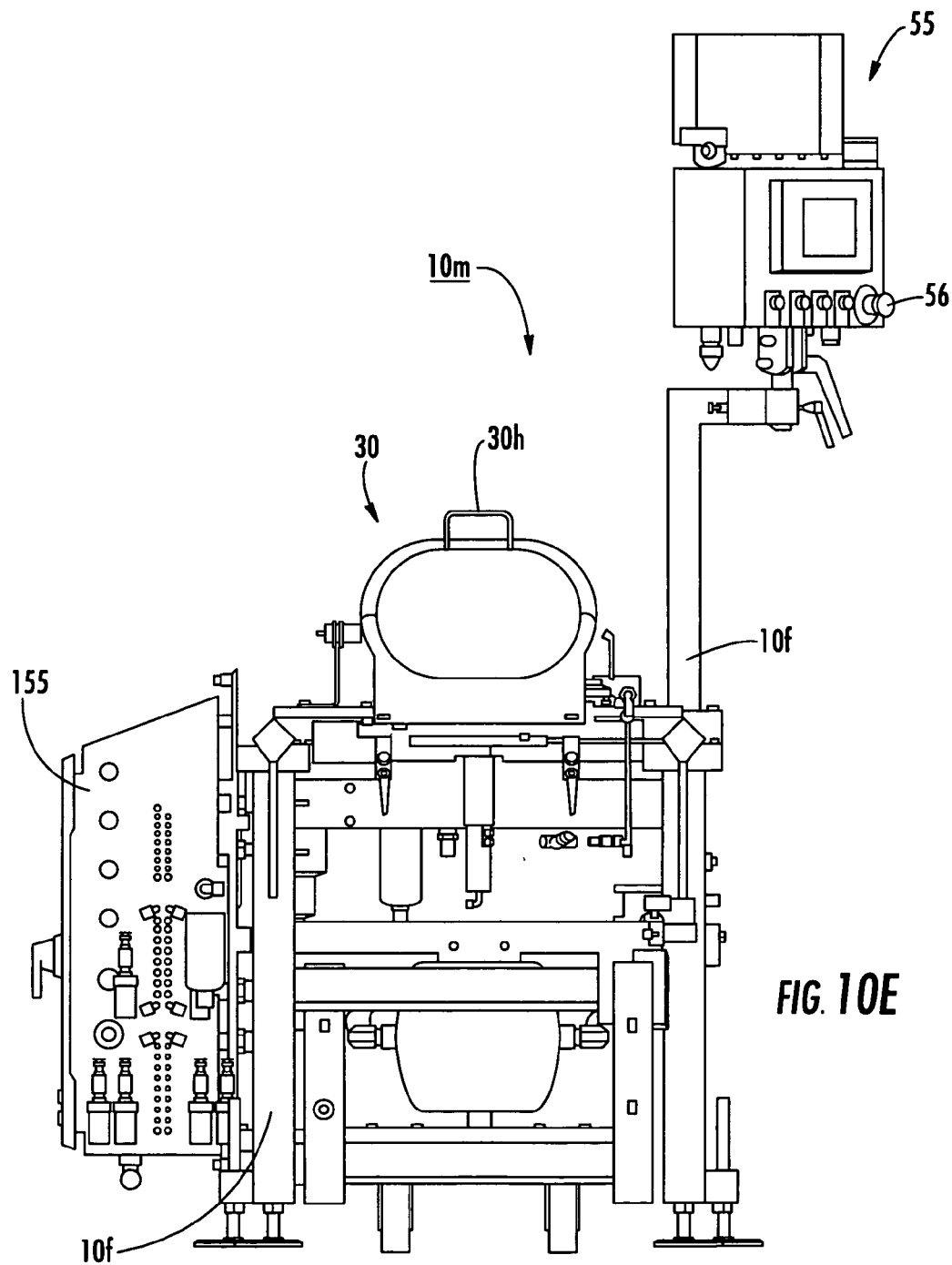
FIG. 10E is an end view (at an upstream location looking downstream) of the device shown in FIG. 10A.
Figure 10F:
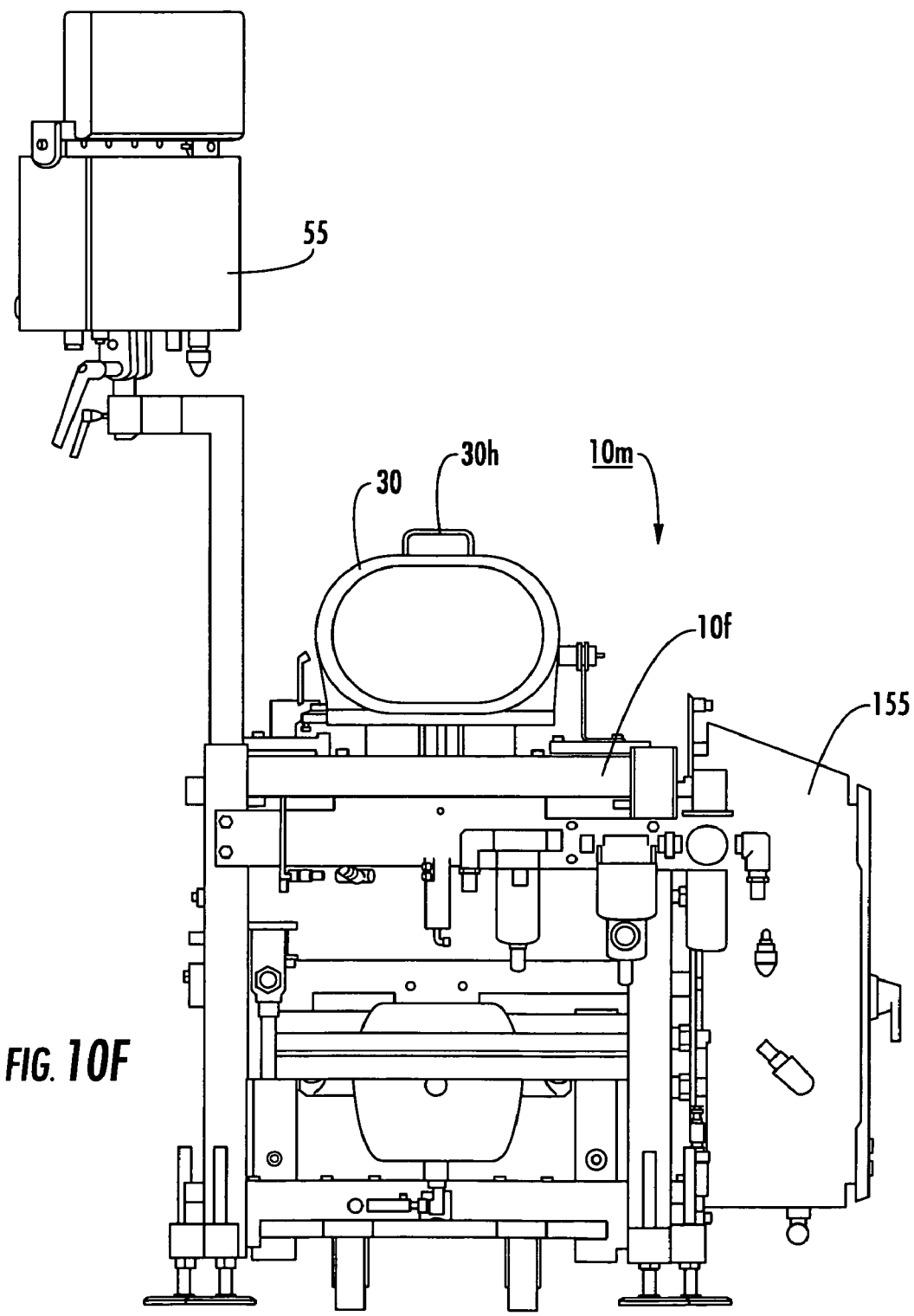
FIG. 10F is an opposite end view (at a downstream location looking upstream) of the device shown in FIG. 10A.

FIGS. 3C and 10B illustrate a side view of the product chute 30 held on a mounting bracket and attached to a front-end frame 10f. As shown, the product chute 30 can be an elongate product chute. The product chute 30 can include a larger front-end cavity area 30a (shown as a funnel-like shape) relative to the intermediate and/or discharging portion 30d, i.e., the chute cavity 30c narrows in the pushing/product travel direction. Thus, the product chute 30 can include a primary body and a larger upstream guide portion that narrows into the shape of the primary body. The chute 30 may be formed as a unitary member or a series of attached members (not shown). The chute 30 can include a lifting handle 30h (FIG. 3C) to facilitate removal and installation. In operation, a supply of covering material 130 (see, e.g., FIG. 3A) can be placed on or about the chute 30, arranged to surround the exterior surface of at least a portion of the product chute 30 and extend in tension in the downstream direction to cover the product (tenting/tensioning in the axial direction) as the product exits the discharge end portion of the product chute 30d. In certain embodiments, the covering material is configured and sized to stretch in at least the lateral direction and typically in both the lateral and axial directions as it is held on and dispensed from the product chute 30.

The product chute floor may comprise a stationary floor with an anti-stick coating or material. It is also noted that the product chute 30 may include a moving floor such as those types described above with respect to the infeed floor configurations. The chute 30 may be sized relative to the product 180 so that the product 180 extends across a major portion of the width of the cavity, and in certain embodiments, extends across at least about 75% of the width of the cavity. In certain embodiments, the product 180 and chute cavity 30c are sized so that the sides and/or top and bottom of the product 180 are pressed against the sidewalls of the cavity as the product is pushed therethrough. The product chute 30 may comprise stainless steel and be coated with a friction reducing material such as TEFLON. Lubricants may also be disposed on the inner surface(s) of the product chute 30.

In certain embodiments, the product chute 30 has a cross-sectional profile that is non-circular. The product chute 30 may be configured with a planar top and/or bottom portion and semi-circular side portions. Other cross-sectional profile configurations may also be used including, but not limited to, circular, oval, triangular, rectangular, square and the like.

FIGS. 10A-10F show that the front-end of the apparatus 10 can be modular so as to define a first front-end module 10m that is configured to engage the clipper modules 40m, 40m'. As shown, the front end module 10m includes a frame 10f that holds a front end portion of the product chute 30, the pusher mechanism 20, the HMI 55, actuation cylinders, pneumatic supply, valves, air lines, the infeed conveyor 50 (FIG. 2), the stop member 65s (FIG. 3C), a control panel 155 and the like. To assemble the clipper modules 40m, 40m' the two frames 10f, 40f are aligned so that the product chute 30 enters the chute window 40w (FIG. 8) and rests on a support member therein. Air and control lines can then be connected to assemble the two modules 10m, 40m (40m') into the apparatus 10. The components of the front-end module 10m may be assembled before or after the two frames 10f, 40f are aligned and/or operatively positioned together.

The front-end portion of the apparatus 100 shown in FIG. 1 may also be configured as a front-end module 100m that can selectively engage the clipper module 40m. The front-end module 100m typically includes a gravity fed product chute 30, a scale 125, and at least one conveyor 121, all of which can be mounted to a common and/or interconnected frame 100f. FIG. 4C illustrates the chute 30 in position in an exemplary embodiment. As shown, the floors 121, 122 are bridged with a stationary ramp member 121r.

The front-end frame 10f, 100f can be configured to accommodate different sizes of interchangeable chutes 30 and/or different widths of conveyors 50, 122, respectively. For example, the apparatus 10, 100 can operate with larger and smaller chutes 30, which can be placed on the frame 10f at the OEM site and/or at a use site, depending on a particular product/use. The chute widths may range from between about 9-13 inches and the height of the chutes 30 may be between about 5-12 inches. A smaller chute 30 may have a cavity that is about 9 inches wide by 5.75 inches tall while a larger chute 30 may have a cavity that is about 13 inches wide by about 11.25 inches tall. The chutes 30 may have a length (at least for the portion having a generally constant cross-sectional area) that is between about 28-30 inches. The chutes 30 may also have a flared or funnel-like entry portion 30f (FIG. 10B) with a length of about 4-10 inches. The funnel 30f may be formed with larger flares for the larger chutes. In addition, the apparatus frame 10f may accommodate conveyors 50 having widths that are between about 18-24 inches wide.

In certain embodiments, the front-end module 10m, 100m can be configured with control program code that includes OEM selectable pre-programmed run modes and options to direct what signals are monitored, the timing, powering and/or other control parameters or input/output of certain automated features. The run modes may be independent of or dependent on the RH or LH mounting of the clipper and/or handle maker. The program run mode will typically be different where the handle-maker is not employed and for each front-end module type employed as certain operational sequences will be different (different actuators, sensor monitoring, and the like). The program run mode may also vary depending on other build modules employed (or not employed). For example, the type of discharge table and/or the type of product clamp employed and whether a printer module is used to print labels.

A computer module can be configured with a query list of build options. The answers can be used to automatically build the desired run routine from a preprogrammed set of operations for a particular modules 40*m*, 40*m*' and/or apparatus 10, 100. In certain embodiments, the answers are used to turn on or off the appropriate computer run modules or sub-routines to facilitate a faster and/or more repeatable program build or compilation for each assembly based on its selected modular build units. The queries may be automatically answered by interrogating an electronic part list or assembly numbers to generate the desired operational program for a particular build based on modules included in that part list or may be answered via an operator or combinations of same.

As shown in FIG. 10A, the chute 30 can attach to a mounting bracket 30*b* that can be configured to relatively easily attach to and be removed from the frame of the apparatus 10 so as to be releasably mountable thereto. The mounting bracket 30*b* can hold the product chute 30 in alignment with the clipper mechanism 40 downstream and the product pusher mechanism 20 upstream. As shown in FIG. 10A, an alligator clip can be used in combination with a sensor 130*s* to clip to a trailing edge of the covering material and trip a switch to automatically monitor and alert when the covering material is low and/or may need replaced. In certain embodiments, the apparatus 10, 100 can include a first product chute and a respective first mounting bracket 30*b* and a second product chute 30 releasably mountable to the apparatus frame 10*f* at the same position (interchangeable chutes) using a respective second mounting bracket 30*b* that can be configured substantially the same as the first mounting bracket 30*b*. In other embodiments, the product chute 30 can be lifted off of the mounting bracket 30*b* (leaving the mounting bracket in place) and another chute 30 placed thereon. The second product chute may be sized and configured the same as the first product chute 30 and loaded with a second supply of covering material. The covering material may be the same as that of the first product chute or different. Thus, the respective first and second mounting brackets 30*b* can be configured as quick disconnect components (merely loosening and/or releasing attachment hardware) to allow the first and second product chutes 30 to be interchanged on the system 10 and/or 100 in under 5 minutes, and more typically in under about 2 minutes, to allow an operator to employ at least one of a different size product chute, a different configuration product chute, different packaging material dispensed by the product chute.

In other embodiments, a plurality of chutes 30 can be mounted on a sliding or movable track that can serially move a selected chute out of and/or into the operative position (not shown). The plurality of chutes 30 may be positioned side to side or above and below each other (vertically stacked), mounted on a carousel, or the like so as to automatically move into and out of position. In operation, an operator or an autoloader can place a sleeve of covering material on one or more chutes 30, select the order of presentation (based on the type of product being dispensed and/or the type of covering material desired), and proceed to move the chutes serially into operative position so as to be aligned with the product pusher assembly 20 and the clipper 40. In this manner, the apparatus 10 and/or 100 can be preloaded or reloaded with covering material limiting any downtime associated therewith.

In any event, the modules 40*m*, 40*m*' can be configured to align with the chute 30 such that the discharge end portion of the product chute 30*d* terminates proximate the clipper 40 with minimal adjustment. The modules 40*m*, 40*m*' are configured to hold the clipper 40 so that the clip window can be axially aligned with a desired axial location of the product travel path in the full clip position, typically substantially aligned with the axial centerline of the chute 30, irrespective of whether the clipper 40 is mounted to the right or left hand side of the frame 40*f*.

As described above, the apparatus 10 can include a brake assembly with brake gripping members 90 (FIG. 9). FIG. 9 illustrates the gripping members 90 are housed in the clipper modules 40*m*, 40*m*' and, in position, reside adjacent the sidewalls of the chute 30. The brake assembly can inhibit an excessive quantity of covering material from being pulled off the chute 30 during product insertion into the covering. The brake assembly may be particularly suitable for use with netting covering materials. In addition, the product covering can be held (stretched axially) to be relatively tight and substantially centered about the encased product. The tightness or tension of the covering material may be adjusted by varying the force that the gripper members 90 apply to the chute 30. Where a pneumatic cylinder is used to automatically operate the brakes, the force/tension adjustment can be carried out by adjusting the air pressure delivered to the cylinder. A pressure regulator for this operation may be disposed on the HMI 55 (FIGS. 1, 2).

In some embodiments, the modules 40*m*, 40*m*' include a product-holding member (i.e., a product clamp) that can automatically be moved into position by actuating a clamp drive cylinder, thereby blocking or trapping the product to inhibit same from moving further downstream. One example is shown in FIGS. 5A and 6 with flap members 67*f*₁, 67*f*₂, that can move in slot 68 and pivot inwardly to trap the product. The optional holding member may be configured to move to its operative holding position prior to retraction of the product pusher assembly 20 and to clamp onto the encased product to inhibit the product from migrating back into the chute as the product pusher head 20*h* is retracted. The holding member can also hold the encased product so that the upstream covering material is relatively firmly or tightly held proximate the clipper 40 and/or facilitate centering the covering material during the gathering and clipping operations. The holding member can be configured to cooperate with the handle maker 60 (where used) and/or the clipper 40. Co-pending, co-assigned U.S. Provisional Application filed Jun. 15, 2004 and identified by 60/579,709 describes a flap configuration that can be used to hold the product and co-pending, co-assigned U.S. Provisional Application Ser. No. 60/508,609 describes a clamp bar; the contents of each of these patent applications are hereby incorporated by reference as if recited in full herein. Thus, other discharge tables or product holding members may be used in lieu of and/or with the table 66.

The actuation of the holding member can be controlled by the PLC using proximity sensors and operation feedback as will be understood by one of skill in the art. The discharge table 66 may be stationary (with or without rollers as shown). In other embodiments, the product table 66 may include a traveling floor (such as a conveyor) that advances the packaged product to another processing or subsequent workstation (not shown).

FIG. 5D illustrates one example of a clipper mechanism 40 assembly. The clipper 40 can include a coupler member 240 that is a hanger with a pivot attachment that allows the clipper body 40b to pivot. The hanger coupler 240 can be supported on an upper portion of the frame 40f (such as by two trunnion type arms as shown) to pivotally mount the clipper to the frame 40f. The clipper 40 can include a curvilinear clip rail or channel 41 that is in communication with the clip window 140w to automatically supply clips to the underlying covering material. The clipper 40 may be particularly suitable for clipping netting but may be used for other materials as well. The clipper 40 can be configured to attach to the coupling member 240 to suspend the clipper from the frame 40f as shown for example in FIG. 5A.

As is well known to those of skill in the art, in operation, the clipper 40 defines a closure/clip delivery path using a clip rail 41 in communication with the clip window 140w in a clip channel for receipt of a U-shaped metal clip. The clip is advanced in the closure path or channel by means of a punch so that the clip will engage a die positioned in a manner permitting the clip to be formed about gathered material that encases the product in the material at a closure zone in the product travel path. Although not illustrated, pressurized air or other means of pressing or moving the clip to close about the tubular package may also be used. As shown, the guide rail 41 can have a curvilinear configuration with a vertical run which is curved at its lower end so that it gradually merges into a horizontal run to direct clips mounted thereon into the window 140w. The clips are typically arranged in a stack with adjacent clips abutting each other so that the legs of each clip fit around the guide rail with a crown of each clip fitting over the guide rail. The multiple clips may be connected to one another by means of a thin elastomeric film, tape or adhesive (typically along the crown) so that the clips together may slide down the guide rail and around the bend therein between the vertical and horizontal runs of the guide rail. Typically, clips are provided in a coil or on a reel for feeding onto the guide rail. Although illustrated herein as a generally vertical and downwardly directed clip feed, other feed orientations may also be employed.

Figure 5E:
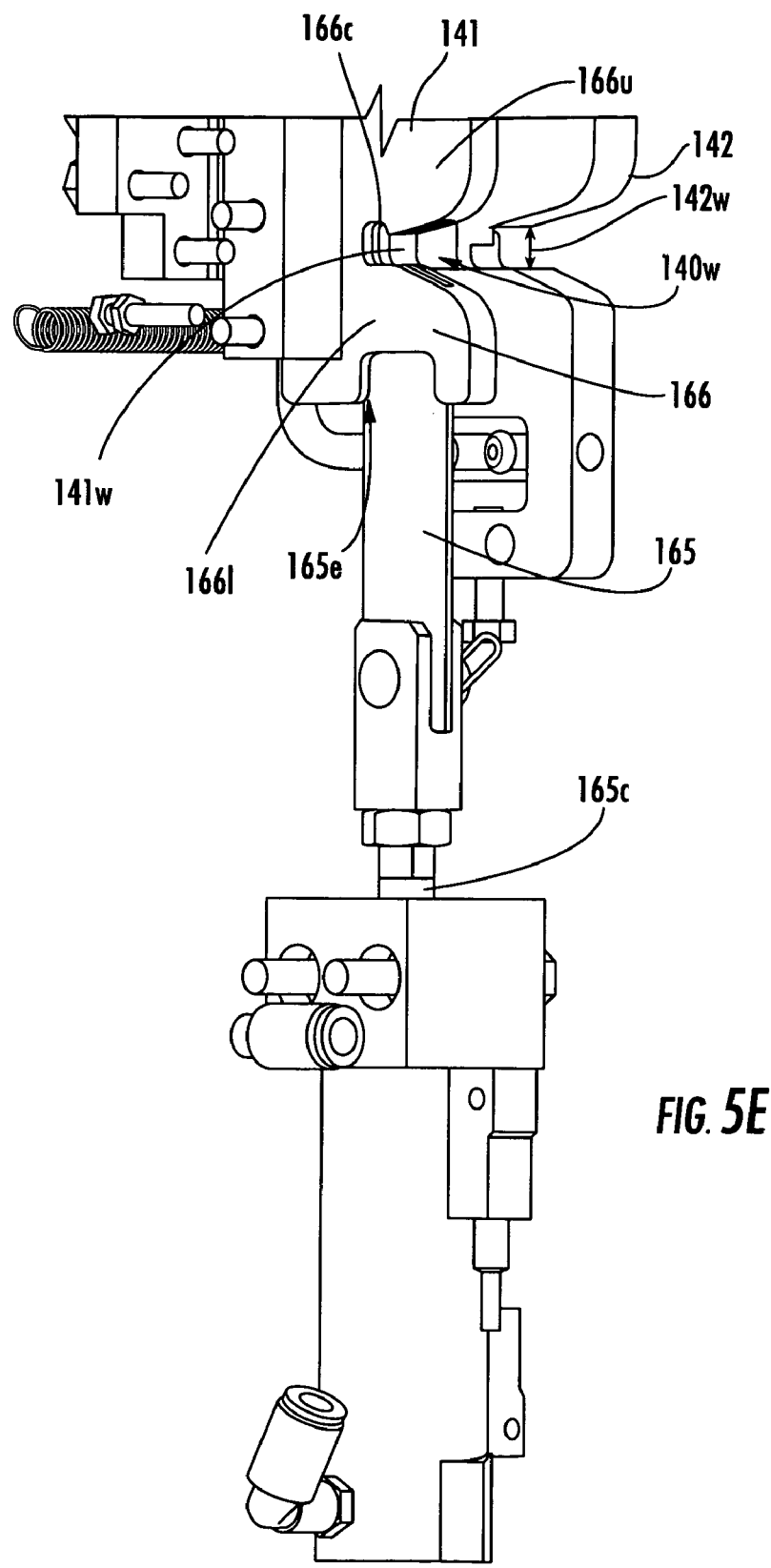
FIG. 5E is a side perspective view of a cutting member assembly according to embodiments of the present invention.

As shown in FIG. 5E, the clipper 40 can include a cutting member 165 mounted to a lower portion of the clipper body. The cutting member 165 is configured to cut from the bottom up. The cutting member 165 can be configured to move in concert with the clipper 40 as the clipper 40 moves to its home and full clip position (and, where used, to the pre-clip position). Gathering plates 141, 142 can be mounted to the lower portion of the clipper 40 with the clip window 140w therebetween. When the clipper 40 is in its full-clip position, the cutting member 165 is generally vertically oriented and disposed under the gathering plate window 141w. The cutting member 165 can then rise to sever the gathered and typically clipped or otherwise closed/sealed covering about the package. The cutting member 165 can be in communication with an actuator 165c that automatically extends the cutting member into the cutting position and retracts the cutting member 165. The cutting member 165 can reside and slidably travel in a cutting guide 166 having a channel 166c. The guide 166 can be aligned with the gathering plates 141, 142, typically disposed axially intermediate thereof (not shown) and can be attached to the clipper 40. In other embodiments, the guide 166 may be formed into a gathering plate. Typically, the guide 166 is disposed proximate but upstream of the clipping location, at least where a single clip is applied. Where two spaced-apart clips are applied to the gathered covering, the guide 166 can be held intermediate the two clip locations to provide the desired cut location.

The cutting guide 166 can have opposing upper and lower portions, respectively, with an intermediate window portion extending intermediate thereof. The window portion can be axially aligned with the gathering plate window 142w. The cutting guide channel 166c can extend both in the upper and lower portions of the guide 166. In operation, the cutting member 165 slides upwardly in the lower channel 166c, extends across the window and into the channel in the upper portion of the cutting guide 165. The cutting guide channel 166c can be formed into a unitary body. Alternatively, the cutting guide 166 can comprise two members with generally planar downwardly extending sidewalls that are spaced apart a distance sufficient to receive and allow the cutting member 165 to slide while retained in a desired alignment. The two spaced apart members may be plates and/or the channel 166c may be generally planar. The cutting member 165 can be configured to remain in the lower body channel 166l during periods of non-use One long edge portion 165 of the cutting member 165 can be retained in the cutting guide channel 166c as the cutting member 166 travels across the guide window into the extended cutting, shearing and/or severing position. Where used, this positive retention of the cutting member 165 may provide additional alignment stability in some applications. The cutting member 165 may be a generally planar blade with a leading angled knife-edge portion. Other cutting configurations can be used including, but not limited to, heat (of whatever type), water, pressure, and other knife and/or blade shapes, as well as combinations thereof. Accordingly, the term "cutting" as used herein is used broadly to mean separating and/or severing adjacent portions of covering material and is not limited to physically cutting with a sharp implement.

In addition, it is noted that the present invention is not limited to a bottom up cutting operation as top-down cutting mechanisms can be used such as, for example, hot-knife devices are described in U.S. Pat. Nos. 4,683,700 and 5,161,347, the contents of which are hereby incorporated by reference as if recited in full herein.

The clipper 40 can include a plurality of spaced apart gathering plates 141, 142 that are configured to automatically gather a portion of the tubular or sleeve of covering material (held in tension) to form the material into a rope-like and/or compressed configuration in preparation for receiving the clip(s) thereabout. The gathering plates 141-142 are configured to gather or compress the covering material that extends between the clipper 40 and the product chute discharge end portion 30d. Pairs of cooperating plates can be positioned across the product travel path to retractably travel toward each other, substantially orthogonal to the direction of product travel, to gather the covering material therebetween. See co-pending, co-assigned U.S. Provisional Patent Application Ser. No. 60/508,609 for additional description, the contents of which have been incorporated by reference hereinabove. As shown, the gathering plates 141, 142 may be mounted to the clipper 40 and can be described as clipper gathering plates or die supports.

In operation, once the covering material is gathered, a clip or clips can be applied to secure the encased product in the covering material. The covering material can then be severed to release the encased product in the clipped package. In certain embodiments, two clips are applied substantially concurrently proximate to each other using a dual clipper so that one clip closes the trailing edge of the covering material forming a first encased package and the other closes a leading edge of the covering material forming the next encased package. The clipped configuration of the covering material encasing the product may be configured to substantially conform to the shape of the enclosed product(s) or may be more loosely configured.

In certain embodiments, after the product moves past (and may be stopped by) the product-holding member $67f_1$, $67f_2$ (FIG. 6), the clipper 40 moves into its full-clip position (either from a home or pre-clip position) with its actuation cylinder 140, which also moves the gathering plates 141, 142 as well as the cutting member guide 166 and cutting member 165 toward the centerline of the travel path. The terms "actuator" or "actuation cylinder" are used generically to indicate any type of automatically moveable actuation member.

In some embodiments, the gathering plates 141, 142, guide 166 and cutting member 165 are mounted to the clipper 40 (i.e., clipper gathering plates) to move in concert therewith. As the clipper 40 is rotated into position, the clipper gathering plates 141, 142 automatically start the gathering operation. In certain embodiments, the modules 40m, 40m' can include additional gathering plates that are positioned on the opposing side of the travel path and which may be configured to laterally linearly translate into and out of operative position. In certain embodiments, each gathering plate can be mounted so that in operative position they are horizontally and vertically aligned with the corresponding centerlines of the product chute cavity 30c.

The operation and sequence of certain events can be controlled by a programmable logic controller and/or other controller. Certain operations may be selected by an operator input using a HMI to communicate with the controller as is well known to those of skill in the art.

FIGS. 11 and 12 illustrate an exemplary factory layout of two side-by-side modules 40m, 40m' and/or automated or semi-automated packaging apparatus of any type. The modules 40m, 40m' may be positioned and used as stand-alone clipping modules 40m, 40m' or may be configured to operate with a front-end module (such as, for example, 10m, 100m, as discussed above). FIGS. 11 and 12 illustrate that the two modules 40m both include an outwardly projecting handle maker 60 that are positioned on opposing sides of their respective frames 40f to extend in opposing directions. In other embodiments, one or both of the modules 40m' may not include the handle maker 60.

The module pairs 40m and/or 40m' can be relatively closely spaced. In some embodiments, the two modules 40m (40m') are spaced apart a distance sufficient to allow a single operator to attend to the operation of certain functions on both modules 40m (40m'), and/or 10m and/or 100m. Thus, the operator workstation can be positioned intermediate the two modules 40m (40m').

The two modules 40m (40m') can be longitudinally offset or generally aligned to have a generally parallel longitudinally common footprint. Pairs of the same apparatus 10 and/or 100, or different apparatus such as 10, 100, stand-alone modules 40m (40m'), or combinations of same, can be arranged in a production facility or factory in this paired manner. In addition, the apparatus 100 shown in FIG. 12 may employ the offset input conveyor 121 (FIG. 4B). Further, the infeed conveyors 121 and/or 50 (of apparatus 100, 10, respectively) may be configured to extend and operate on the same side as the handle maker 60.

Figure 13:
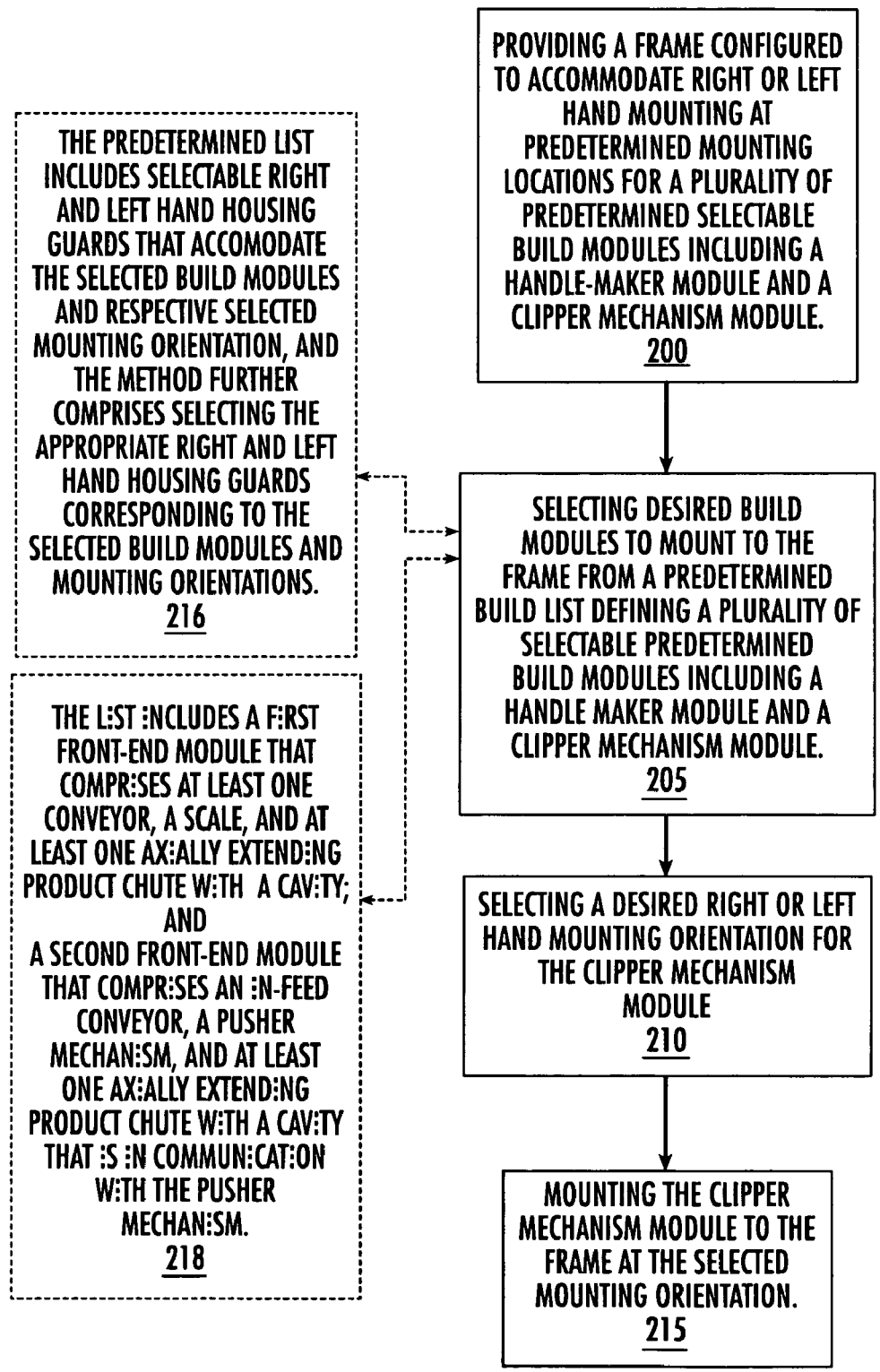
FIG. 13 is a flow chart of operations that can be carried out according to embodiments of the present invention.

FIG. 13 illustrates exemplary operations that may be carried out according to embodiments of the present invention for building packaging apparatus with modularized selectable build configurations. A frame can be provided that is configured to accommodate right or left hand mounting at predetermined mounting locations for a plurality of predetermined selectable build modules including a handle-maker module and a clipper mechanism module (block 200). The desired build modules can be selected to mount to the frame from a predetermined build list defining a plurality of selectable predetermined build modules including a handle maker module and a clipper mechanism module (block 205). The desired right or left hand mounting orientation for the clipper mechanism module is selected (block 210). The clipper mechanism module is mounted to the frame at the selected mounting orientation (block 215).

The predetermined list can include selectable right and left hand housing guards that accommodate the selected build modules and respective selected mounting orientation, and the method further comprises selecting the appropriate right and left hand housing guards corresponding to the selected build modules and mounting orientations (block 216). The predetermined build list can also include: a first front-end module that comprises at least one conveyor, a scale, and at least one axially extending product chute with a cavity; and a second front-end module that comprises an in-feed conveyor, a pusher mechanism, and at least one axially extending product chute with a cavity that is in communication with the pusher mechanism (block 218).

The predetermined build list may include selectable RH and LH housing guards that accommodate the selected build options (modules and orientation) and a manufacturer can select the appropriate housing guards corresponding to the selected builds. For example, where a handle maker 60 is not used, the RH and LH housing guards are generally planar continuous sidewalls that enclose the clipper mechanism, and voider mechanism in the module 40m'. However, where a handle maker 60 is used, the housing guard 11g can include a handle maker window that allows the front end of the device to be in communication with the product flow path.

Figure 14:
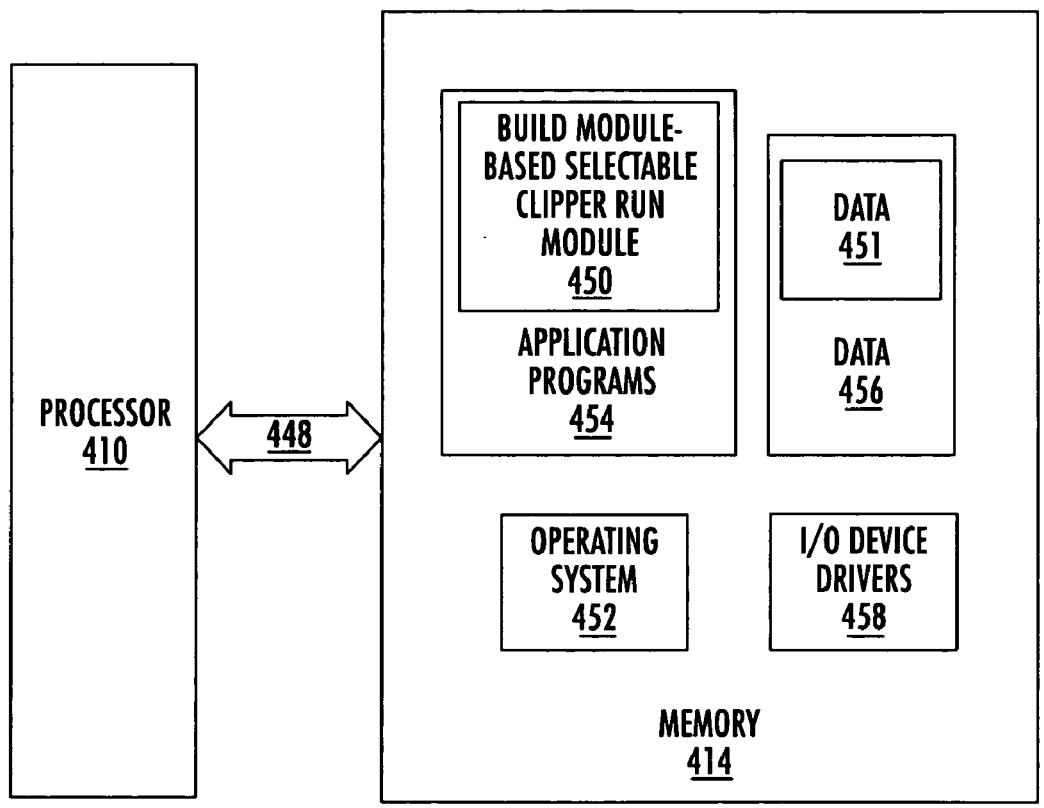
FIG. 14 is a block diagram of a data processing system/computer program according to embodiments of the present invention.

FIG. 14 is a block diagram of exemplary embodiments of data processing systems that illustrates systems, methods, and computer program products in accordance with embodiments of the present invention. The data processing systems may be incorporated in a programmable logic controller (such as station 55) and/or be in communication therewith. The processor 410 communicates with the memory 414 via an address/data bus 448. The processor 410 can be any commercially available or custom microprocessor. The memory 414 is representative of the overall hierarchy of memory devices containing the software and data used to implement the functionality of the data processing system. The memory 414 can include, but is not limited to, the following types of devices: cache, ROM, PROM, EPROM, EEPROM, flash memory, SRAM, and DRAM.

As shown in FIG. 14, the memory 414 may include several categories of software and data used in the data processing system: the operating system 452; the application programs 454; the input/output (I/O) device drivers 458; the Build-Module based Selectable Clipper Run Program Module 450; and the data 456. The Build Module Based Selectable Clipper Run Program Module 450 can be modified based on whether a handle maker, printer or other predetermined module is included or excluded from the device and/or whether there is a RH or LH clipper operation sequence.

The data 456 may include a look-up chart of different module part lists, configurations, run sequences, target products, covering material type, proximity sensor feedback, safety interlock circuits and the like 451 corresponding to particular or target products for one or more producers or module build types.

As will be appreciated by those of skill in the art, the operating system 452 may be any operating system suitable for use with a data processing system, such as OS/2, AIX, DOS, OS/390 or System390 from International Business Machines Corporation, Armonk, N.Y., Windows CE, Windows NT, Windows95, Windows98 or Windows2000 from Microsoft Corporation, Redmond, Wash., Unik or Linux or FreeBSD, Palm OS from Palm, Inc., Mac OS from Apple Computer, LabView, or proprietary operating systems. The I/O device drivers 458 typically include software routines accessed through the operating system 452 by the application programs 454 to communicate with devices such as I/O data port(s), data storage 456 and certain memory 414 components. The application programs 454 are illustrative of the programs that implement the various features of the data processing system and can include at least one application, which supports operations according to embodiments of the present invention. Finally, the data 456 represents the static and dynamic data used by the application programs 454, the operating system 452, the I/O device drivers 458, and other software programs that may reside in the memory 414.

While the present invention is illustrated, for example, with reference to the Module 450 being an application program in FIG. 14, as will be appreciated by those of skill in the art, other configurations may also be utilized while still benefiting from the teachings of the present invention. For example, the Module 450 may also be incorporated into the operating system 452, the I/O device drivers 458 or other such logical division of the data processing system. Thus, the present invention should not be construed as limited to the configuration of FIG. 14, which is intended to encompass any configuration capable of carrying out the operations described herein. Further, the Module 450 can be used to communicate with other apparatus.

The I/O data port can be used to transfer information between the data processing system, the product pusher, and the clipper mechanism or another computer system or a network (e.g., the Internet) or to other devices controlled by the processor. These components may be conventional components such as those used in many conventional data processing systems which may be configured in accordance with the present invention to operate as described herein.

For example, certain embodiments of the present invention are directed to a computer program product for operating an automated clipped (netting) packaging apparatus so that the clipper mechanism operates from either a left or right hand side. The computer program product can include computer readable program code that allows a user to select left hand or right hand clipping mechanism operation, which may be programmed or selected at the OEM site. That is, the controller may have a plurality of selectable program sequences, one for operating left hand operation and one for right hand operation (for either or both the handle-maker and/or clipper) and/or for operating an apparatus with a handle maker and/or printer or without. During assembly and/or test, an OEM site can lock in the proper operational sequence. In other embodiments, the program run mode can be indifferent to which mounting orientation is used and, as such, a common program can be used to operate the apparatus irrespective of which mounting orientation is employed.

The automated/semi-automated packaging apparatus can include an automated product pusher mechanism that advances and retracts from a product chute and an automated clipping apparatus that applies at least one closure clip to netting thereat. The computer program product can include: (a) computer readable program code that automatically controllably actuates a pusher actuation cylinder to push a pusher in a downstream direction; and (b) computer readable program code that automatically controllably actuates a clipper mechanism to position a clipping apparatus in a clipping position in response to product pushed by the product pusher out of the product chute and covered in netting.

In particular embodiments, the computer program product can also include one or more of: (a) computer readable program code that automatically controllably actuates netting gathering plate actuation cylinders to laterally translate the plates toward the clipper mechanism; (b) computer readable program code that automatically controllably actuates a package holding member to maintain a product held in netting in alignment with the clipper mechanism; (c) computer readable program code that monitors a proximity sensor positioned to detect when a product is in position to be packaged and automatically controllably actuates the pusher cylinder in response thereto; (d) computer readable program code that prevents actuation of the pusher cylinder when the product chute is not in proper position; (e) computer readable program code that actuates a cutting tool actuation cylinder to controllably advance the cutting tool and automatically sever netting intermediate two clips thereon; (f) computer readable program code that supplies heat to the cutting tool; (g) computer readable program code that automatically actuates clip pushers in the clipper mechanism when netting is gathered and in position for clipping at the clipping window; (h) computer readable program code that controls the actuation of a braking mechanism to advance the braking mechanism to contact the product chute and selectively apply pressure to netting thereat; (i) computer readable program code that automatically controllably actuates the pusher actuation cylinder to pull a product pusher in an upstream direction out of the product chute; and (j) computer readable program code that automatically controllably actuates the clipper mechanism to remove the clipping apparatus from the clipping position.

While the present invention is illustrated, for example, with reference to particular divisions of programs, functions and memories, the present invention should not be construed as limited to such logical divisions. Thus, the present invention should not be construed as limited to the configuration of FIG. 14 but is intended to encompass any configuration capable of carrying out the operations described herein.

The flowcharts and block diagrams of certain of the figures herein illustrate the architecture, functionality, and operation of possible implementations of the present invention. In this regard, each block in the flow charts or block diagrams represents a module, segment, or portion of code, which comprises one or more executable instructions for implementing the specified logical function(s). It should also be noted that in some alternative implementations, the functions noted in the blocks may occur out of the order noted in the figures. For example, two blocks shown in succession may in fact be executed substantially concurrently or the blocks may sometimes be executed in the reverse order, depending upon the functionality involved.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, where used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A packaging apparatus module, comprising:
a frame with a base adapted to reside on a support floor, the frame having opposing right and left hand frame sides and at least one lateral beam that extends therebetween, the right and left hand frame sides comprising respective upwardly extending frame portions which are configured to reside on opposing sides of a longitudinally extending product travel path having an axially extending centerline; and
a clipper mechanism configured to mount to both of the right and left hand frame sides but, in position, selectively mounts to a single frame side in a manner that positions the clipper mechanism at a substantially common operative full-clip location in the product travel path when mounted to either the right or left hand frame sides whereby the frame and clipper mechanism define modular left and right hand build configurations to thereby allow build options with selectable mounting orientations.

2. A module according to claim 1, wherein the clipper mechanism is configured to attach to a predetermined upper portion of the right and/or left frame side to be able to pivot in toward the axial centerline of the product travel path to the full clip position whether mounted on the right or left side of the frame.

3. A module according to claim 1, wherein the frame is configured and sized to receive and hold the clipper mechanism to allow the clipper mechanism to travel transversely relative to the product travel path axial centerline, and wherein the product travel path axial centerline generally corresponds to an axial centerline of a product netting chute located upstream thereof.

4. A module according to claim 3, wherein the clipper mechanism has a clipper body that is pivotably attached to the frame and travels between a generally upright home position that is located laterally spaced apart from the product travel path centerline and an angled full clip position.

5. A module according to claim 4, further comprising a two-stroke actuation cylinder that is in communication with the clipper mechanism to direct the clipper mechanism to travel in a travel stroke cycle that includes, the home position, the full-clip position and a pre-clip position that is from between about 50-75% of the stroke distance between the home and full-clip positions.

6. A module according to claim 1, further comprising a voiding mechanism comprising first and second longitudinally spaced apart voiding plates mounted to the frame in a predetermined location so as to be in cooperating alignment with the clipping mechanism irrespective of whether the clipper mechanism is mounted on the first or second side of the frame for automatically gathering together a length of a leading and/or trailing edge portion of covering material held about a target product for clipping by the clipping mechanism.

7. A module according to claim 1, further comprising at least one gathering plate, a cutting member, and a cutting member guide channel held on the clipper mechanism, wherein the at least one gathering plate, the cutting member and the cutting member guide channel all travel with the clipper mechanism from a home position to the full clip position, wherein the cutting member guide channel comprises a downwardly extending channel sized and configured to slidably receive the cutting member and to allow the cutting member to slide therein during operative extension into a cutting position to sever gathered covering material with an upward stroke.

8. A module according to claim 7, further comprising a cutting actuation cylinder in communication with the cutting member that vertically extends and retracts the cutting member during a cutting operation.

9. A module according to claim 1, wherein the frame comprises a plurality of apertures formed in predetermined locations, the aperture locations providing alignment and/or mounting apertures for the clipper mechanism when mounted on the right or left hand side of the frame.

10. A module according to claim 1, further comprising a handle maker selectably mounted to either the right or left side of the frame while being mountable to both sides of the frame using pre-formed mounting apertures residing on both of the frame sides, wherein the handle maker is mounted to a different side of the frame than the clipper mechanism.

11. A module according to claim 10, wherein the frame comprises a plurality of apertures formed in predetermined locations on each of the right and left hand sides of the frame to define mounting apertures for alignment of the clipper mechanism and the handle maker and left and right hand assembly orientations allowing each to be selectively mounted to either the right or left hand side of the frame.

12. A module according to claim 10, further comprising a handle maker support bracket that extends outwardly from and attaches to the frame to hold the handle maker thereon so that a forward portion of the handle maker is in communication with the product travel path and a rearward portion extends outwardly generally orthogonal to the product travel path.

13. A module according to claim 1, wherein the frame is configured to provide an input chute window configured in communication with the product travel path and sized to receive a discharge end portion of a netting chute and an opposing product output window located downstream of the input chute window configured to allow a product to exit therethrough.

14. A module according to claim 13, further comprising housing guards configured to attach to the frame, wherein the housing guards include first and second selectable left-hand housing guards, the first being a generally planar continuous upstanding sidewall that is used when the clipper mechanism is mounted on the left hand side of the frame and when the clipper is mounted to the right hand side of the frame with the module being devoid of a handle maker, and the second being a generally planar upstanding sidewall with a handle maker window formed therein.

15. A module according to claim 14, wherein the housing guards further include two selectable right-hand housing guards, one of which is a generally planar upstanding sidewall that is used when the clipper mechanism is mounted on the right hand side of the frame and when the clipper is mounted to the left hand side of the frame with the module devoid of a handle maker, and the other of which is a generally planar upstanding sidewall with a handle maker window foamed therein used when a handle maker is mounted on the right hand side of the frame.

16. A module according to claim 13, further comprising first and second product discharge trays that can each mount to a generally common portion of the frame in communication with the product output window, the first tray comprising a roller floor and the second tray comprising a ribbed floor with pivoting flaps that trap the product upstream thereof.

17. A module according to claim 1, further comprising a printer support member that is configured to mount to the frame, the printer support member configured to position a printer to be in communication with a label feed window that feeds labels into the product flow path.

18. A module according to claim 17, further comprising a printer on the printer support member, wherein the printer support member is attached to the frame to position the printer upstream of the clipper mechanism, and wherein the printer support member is configured to attach to a selectable right or left side of the frame corresponding on the same side as the clipper mechanism.

19. A module according to claim 18, wherein the printer support member has an outer pivot leg that allows the printer support member to pivot laterally outward and away from the product travel path.

20. A module according to claim 1, wherein the module is configured to selectively cooperatively engage with a first front-end module having a gravity fed netting chute and a second front-end module having an automated pusher and netting chute to define a packaging apparatus.

21. A packaging apparatus module according to claim 1, wherein the frame includes left hand and right hand mounting apertures on the left and right hand frame sides, respectively, the apertures configured to accept mounting members to mount the clipper to either the right or left hand frame sides.

22. A packaging apparatus module according to claim 21, wherein the apertures on the side of the frame not used to mount the clipper are sealed, closed or filled.

23. A modular packaging apparatus having multiple predetermined selectable sub-module build configurations, comprising:
(a) a clipping module comprising:
a frame with a base adapted to reside on a support floor, the frame having opposing right and left hand frame sides, at least one lateral upper beam and at least one lateral lower beam that extend therebetween, the right and left hand frame sides comprising respective upwardly extending frame portions which are configured to reside on opposing sides of a longitudinal product travel path having an axially extending centerline;
a clipper mechanism mountable to the frame at a predetermined location or locations on each of the right and left hand side of the frame but being mounted to a single side of the frame, the clipper mechanism comprising an actuation cylinder in communication with the clipper mechanism for translating the clipping mechanism through a predetermined stroke cycle including a home and full-clip position;
selectable first and second discharge trays mountable to the frame downstream of the clipper mechanism; and
(b) selectable first and second front end modules, each comprising a product chute with an axial centerline extending therethrough configured to reside upstream of the frame of the clipping module, wherein each of the first and second front end modules are configured to selectively serially engage the clipping module to align the product chute with a travel path extending through the clipping module to supply product through the product chute to the clipping module, wherein the first selectable front end module chute is gravity fed and the second front end module includes an automatic pusher module that pushes product through the product chute.

24. An apparatus according to claim 23, the clipper module further comprising:
an optional printer module with a printer support member that is configured to mount to at least one predetermined location on the frame;
an optional handle maker with a handle maker support member that is configured to mount to a predetermined location on either the right or left hand side of the frame, the handle maker support member attaching to the frame on a side that is across from the clipping mechanism; and
a voiding mechanism that mounts to the frame in cooperating communication with the clipper mechanism.

25. An apparatus according to claim 24, wherein the clipper mechanism is pivotably attached to the frame, and wherein the cutting member is attached to the clipper mechanism and travels with the clipper mechanism as the clipper mechanism moves from the home to the full clip position.

26. An apparatus according to claim 25, wherein the clipping module comprises a knife actuator cylinder in communication with the cutting member that automatically vertically extends and retracts the cutting member in the guide channel during a cutting operation after the clipper mechanism is in the full clip position.

27. An apparatus according to claim 23, wherein the clipping mechanism comprises a knife that cuts gathered covering material pulled from the product chute with an upward stroke.

28. An apparatus according to claim 23, further comprising a supply of netting held on the product chute so that product exiting the product chute is automatically wrapped in the netting, wherein the clipper mechanism comprises at least first and second spaced apart gathering plates attached thereto for automatically gathering a length of a leading and/or trailing edge portion of netting material held about a target product together for clipping by the clipping mechanism.

29. An apparatus according to claim 28, wherein the clipper mechanism further comprises a cutting member guide channel disposed intermediate the first and second gathering plates and attached to the clipper mechanism, the guide channel being a downwardly extending channel configured to slidably receive the cutting member therein during operation into a cutting position.

30. An apparatus according to claim 23, wherein the clipper mechanism is configured to operate with an automatic stroke cycle that comprises a first retracted home position, a second pre-clip position, and a third clipping position.

31. An apparatus according to claim 30, wherein the second clipper mechanism position is about 75% of the stroke distance between the first and third clipper mechanism positions.

32. An apparatus according to claim 23, wherein the clipper module comprises a chute window and a chute support member, and wherein, in position, the product chute of the front-end module resides on the chute support member.

33. An apparatus according to claim 23, wherein the selectable first and second front end modules mount to a front end frame that attaches to the clipper module frame such that the respective product chute is aligned with the clipper module.

34. An apparatus according to claim 23, wherein the frame includes left hand and right hand mounting apertures on the left and right hand frame sides, respectively, the apertures configured to accept mounting members to mount the clipper to either the right or left hand frame sides.

35. An apparatus according to claim 34, wherein the apertures on the side of the frame not used to mount the clipper are sealed, closed or filled.

36. An apparatus according to claim 23, further comprising a controller in communication with the clipper and the front end module that directs different operational sequences using different run modes based on which front end module that is in use.

* * * * *

UNITED STATES PATENT AND TRADEMARK OFFICE
CERTIFICATE OF CORRECTION

| | | |
|---|---|---|
| PATENT NO. | : 7,966,793 B2 | Page 1 of 1 |
| APPLICATION NO. | : 11/151670 | |
| DATED | : June 28, 2011 | |
| INVENTOR(S) | : Griggs et al. | |

It is certified that error appears in the above-identified patent and that said Letters Patent is hereby corrected as shown below:

Column 26, Claim 15, Line 59: Please correct "foamed" to read -- formed --

Signed and Sealed this
Twenty-ninth Day of November, 2011

David J. Kappos
*Director of the United States Patent and Trademark Office*